United States Patent
Hur et al.

(10) Patent No.: US 9,224,542 B2
(45) Date of Patent: Dec. 29, 2015

(54) CONDUCTIVE LAYERED STRUCTURE, ELECTRODE AND SUPERCAPACITOR COMPRISING THE CONDUCTIVE LAYERED STRUCTURE, AND METHOD FOR PREPARING THE CONDUCTIVE LAYERED STRUCTURE

(71) Applicant: SAMSUNG ELECTRONICS CO., LTD., Suwon-si (KR)

(72) Inventors: Jae-hyun Hur, Yongin-si (KR); No-kyoung Park, Hwaseong-si (KR); Kyu-hyun Im, Yongin-si (KR); Sung-woo Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 13/951,977

(22) Filed: Jul. 26, 2013

(65) Prior Publication Data
US 2014/0029162 A1    Jan. 30, 2014

(30) Foreign Application Priority Data

Jul. 26, 2012 (KR) .................. 10-2012-0081964
Nov. 12, 2012 (KR) .................. 10-2012-0127735
Apr. 17, 2013 (KR) .................. 10-2013-0042425

(51) Int. Cl.
  *H01G 11/30* (2013.01)
  *H01G 11/36* (2013.01)
  *H01G 9/00* (2006.01)
  *H01G 11/24* (2013.01)
  *H01G 11/86* (2013.01)

(52) U.S. Cl.
CPC ............ *H01G 11/30* (2013.01); *H01G 11/24* (2013.01); *H01G 11/86* (2013.01); *H01G 11/36* (2013.01); *Y02E 60/13* (2013.01)

(58) Field of Classification Search
CPC ...... H01G 11/30; H01G 11/36; C01B 33/152; Y10S 524/916; Y02E 60/13
USPC .......................... 361/502; 174/126.1; 427/58
See application file for complete search history.

(56) References Cited

U.S. PATENT DOCUMENTS 6,248,529 B1    6/2001  Connolly
8,902,567 B2 *  12/2014  Chacko ..................... 361/525
(Continued)

FOREIGN PATENT DOCUMENTS

JP    2008-85267 A    4/2008
JP    2009087745 A *  4/2009
(Continued)

OTHER PUBLICATIONS

Hur et al., DNA Hydrogel-nased supercapacitors operating in physiological fluids, Feb. 15, 2013, Scientific Reports.*
(Continued)

*Primary Examiner* — Jeremy C Norris
*Assistant Examiner* — Nathan Milakovich
(74) *Attorney, Agent, or Firm* — Sughrue Mion, PLLC

(57) ABSTRACT

Provided are a conductive layered structure including a DNA hydrogel and a composite layer disposed on the DNA hydrogel. The composite layer may include a polymer electrolyte and a conductive material. Also provided are an electrode and a supercapacitor, each including the conductive layered structure. Further provided is a method of manufacturing the conductive layered structure. Thus, a biocompatible, implantable electrode having a large specific surface area and a high conductivity may be manufactured through simple processes.

48 Claims, 40 Drawing Sheets

(56) References Cited

U.S. PATENT DOCUMENTS

| | | | |
|---|---|---|---|
| 2009/0197138 A1* | 8/2009 | Hammond et al. | 429/33 |
| 2011/0287316 A1 | 11/2011 | Lu et al. | |
| 2011/0304953 A1 | 12/2011 | Zhou et al. | |
| 2011/0305970 A1* | 12/2011 | Sahai et al. | 429/492 |
| 2012/0026643 A1 | 2/2012 | Yu et al. | |
| 2012/0100217 A1* | 4/2012 | Green et al. | 424/487 |
| 2012/0184974 A1 | 7/2012 | Becker | |
| 2012/0185024 A1 | 7/2012 | Hauer et al. | |
| 2012/0185034 A1 | 7/2012 | Hossainy et al. | |
| 2012/0185040 A1 | 7/2012 | Rahdert et al. | |
| 2012/0185045 A1 | 7/2012 | Morris et al. | |
| 2012/0185048 A1 | 7/2012 | Phelps | |
| 2013/0001090 A1* | 1/2013 | Rubinson et al. | 205/118 |
| 2014/0104753 A1* | 4/2014 | Park et al. | 361/502 |
| 2014/0335184 A1* | 11/2014 | Park et al. | 424/489 |
| 2015/0001076 A1* | 1/2015 | Porro et al. | 204/412 |
| 2015/0098167 A1* | 4/2015 | El-Kady et al. | 361/502 |

FOREIGN PATENT DOCUMENTS

| | | |
|---|---|---|
| JP | 4739067 B2 | 8/2011 |
| KR | 10-2009-0076569 A | 7/2009 |
| KR | 10-2011-0080054 A | 7/2011 |

OTHER PUBLICATIONS

Viventi, Jonathan et al., "Flexible, Foldable, Actively Multiplexed, High-Density Electrode Array for Mapping Brain Activity in vivo", Nat Neurosci., pp. 1-19, Jun. 1, 2012.

Rogers, John A. et al., "Material and Mechanics for Stretchable Electronics", Science, vol. 237, pp. 1603-1607, Mar. 26, 2010.

Lang, Xingyou et al., "Nanoporous metal/oxide hybrid electrodes for electrochemical supercapacitors", Nature Nanotechnology, vol. 6, pp. 232-236, Apr. 2011.

Cho, Hyunduck et al., "Organic Thin-Film Transistors with Transfer-Printed Au Electrodes on Flexible Substrates", Japanese Journal of Applied Physics, 49, May 20, 2010, 4 pages total.

Nakanishi, Hideyuki et al., "Supercapacitors Based on Metal Electrodes Prepared from Nanoparticle Mixtures at Room Temperature", The Journal of Physical Chemistry Letters, Apr. 16, 2010, pp. 1428-1431.

Bettinger et al., "Organic Thin-Film Transistors Fabricated on Resorbable Biomaterial Substrates", Advanced Materials, pp. 651-655, 2010.

Decher, Gero, "Fuzzy nanoassemblies: Toward layered Polymeric Multicomposites", Science Magazine, vol. 277, pp. 1232-1237, Aug. 29, 1997.

Pech, David et al., "Ultrahigh-power micrometre-sized supercapacitors based on onion-like carbon", Nature Nanotechnology, vol. 5, pp. 651-654, Sep. 2010.

Dae-Hyeong Kim, et al, "Dissolvable films of silk fibroin for ultrathin conformal bio-integrated electronics", Nature Materials, vol. 9, No. 6, pp. 511-517, Jun. 2010, including Supplementary Information, 19 pages.

Dae-Hyeong Kim, et al, "Epidermal Electronics", Science Magazine, vol. 33, Aug. 12, 2011.

M. Slepian et al., "Multifunctional balloon catheters of the future", Interventional Cardiology, vol. 3, pp. 417-419, 2011.

* cited by examiner

CONDUCTIVE LAYERED STRUCTURE, ELECTRODE AND SUPERCAPACITOR COMPRISING THE CONDUCTIVE LAYERED STRUCTURE, AND METHOD FOR PREPARING THE CONDUCTIVE LAYERED STRUCTURE

CROSS-REFERENCE TO RELATED APPLICATIONS

This application claims the benefit of Korean Patent Application No. 10-2012-0081964, filed on Jul. 26, 2012, Korean Patent Application No. 10-2012-0127735, filed on Nov. 12, 2012, and Korean Patent Application No. 10-2013-0042425, filed on Apr. 17, 2013 in the Korean Intellectual Property Office, the disclosures of which are incorporated herein in their entireties by reference.

BACKGROUND

1. Field

The present inventive concept relates to a conductive layered structure having a large specific surface area and a high conductivity, an electrode and a supercapacitor that include the conductive layered structure, and a method of preparing the conductive layered structure.

2. Description of the Related Art

Secondary batteries and electrochemical capacitors are typical examples of energy storage devices based on electrochemical principles. Secondary batteries have high energy density per unit weight or unit volume, but have short lifetime and low output density and take long time for charging. Electrochemical capacitors known as supercapacitors have about 1000 times or greater specific capacitance than common electrostatic capacitors, take less time for charging and have high output density, but have low energy density.

Supercapacitors or electrochemical capacitors that electrochemically store energy via electric double layers (EDLs) have high power output, long lifetime stability, and a rapid charge/discharge rate, and are environmentally friendly. Due to these advantages, much research has been conducted on them for applications in small, portable electronic devices.

Objectives in supercapacitor research are mostly to develop an electrode material having a high conductivity and a large specific surface area through simple processes at low costs. It is crucial to find out a material-process combination satisfying these requirements.

Methods of manufacturing a supercapacitor electrode may be classified into the following two categories. A first method is of manufacturing an electrode by increasing a specific surface area of a high conductive carbonaceous material. Use of carbonaceous materials is advantageous in terms of low price and easy processibility into various forms. For example, carbonaceous materials can be processed into powder, fiber, foam, fabric, or composite. Processing carbonaceous materials into various forms may involve a high-temperature process (800° C. or higher) for a high pore density. Also, in manufacturing an electrode using the resulting product, an insulating binder material is added thereto, the conductivity and the specific surface area of the material may be reduced due to the binder. A second method uses a stable metal material resistant to oxidation. The most common method is de-alloying, which involves preparing an alloy of metals, and selectively melting one of the metals to obtain a porous metal structure. However, this porous metal structure is highly vulnerable to damage during an etching process, and appropriate source metals resistant to oxidation in electrolyte solution are mostly expensive precious metals.

Biocompatible or implantable devices are harmless to the human body and implantable into a human organ. These artificial devices may be inserted into an impaired or abnormally operating human organ to relieve or recover the patient from the illness, and thus should be normally operable in physiological environments to satisfy both the requirements for biocompatibility (or non-cytotoxicity) and biofunctionality.

Existing implantable devices have been limited only to simple electrodes for reading electric signals or catheter. An implantable energy storage device has not been available yet.

SUMMARY

Provided is a conductive layered structure having a high conductivity and a large specific surface area.

Provided is a biocompatible electrode with improvements in cycle lifetime and electrical characteristics.

Provided is a supercapacitor with a high specific capacitance.

Provided is as method of manufacturing the conductive layered structure.

Additional aspects will be set forth in part in the description which follows and, in part, will be apparent from the description, or may be learned by practice of the presented embodiments.

According to an exemplary embodiment, a conductive layered structure may include: a DNA hydrogel; and a composite layer of a polymer electrolyte and a conductive material on the DNA hydrogel.

An exemplary embodiment discloses a conductive layered structure which may include: a DNA hydrogel; and a composite layer comprising a polymer electrolyte and a conductive material, the composite layer being disposed on the DNA hydrogel.

The composite layer may have a multi-layer structure including 2 to 20 layers.

According to another exemplary embodiment, the conductive material may be a conductive polymer, a carbon nanotube, or a reduced graphene oxide (RGO).

According to another exemplary embodiment, an electrode for a supercapacitor includes: a current collector; and an electrode active material disposed on the current collector, wherein the electrode active material includes: a DNA hydrogel; and a composite layer of a polymer electrolyte and a conductive material disposed on the DNA hydrogel.

An exemplary embodiment discloses an electrode including: a current collector; and an electrode active material disposed on the current collector. The electrode active material may include: a DNA hydrogel; and a composite layer comprising a polymer electrolyte and a conductive material, the composite layer being disposed on the DNA hydrogel.

The current collector may be a biocompatible current collector.

According to another exemplary embodiment, a supercapacitor may include: a cathode; an anode; and an electrolyte disposed between the cathode and the anode, wherein at least one of the cathode and the anode is an electrode including a current collector; and an electrode active material disposed on the current collector, the electrolyte active material including: a DNA hydrogel; and a composite layer of a polymer electrolyte and a conductive material disposed on the DNA hydrogel.

According to another exemplary embodiment, a method of manufacturing a conductive layered structure may include: preparing a DNA hydrogel; immersing the DNA hydrogel in a first polymer electrolyte solution having a polarity opposite to the DNA hydrogel; drying the immersed DNA hydrogel to form a first polymer electrolyte layer on the DNA hydrogel; and immersing the DNA hydrogel with the first polymer electrolyte layer in a second polymer electrolyte solution having a polarity opposite to the first polymer electrolyte layer; and drying the immersed DNA hydrogel with the first polymer electrolyte layer to form a second polymer electrolyte layer on the first polymer electrolyte layer on the DNA hydrogel, wherein the second polymer electrolyte layer is a composite layer in which a conductive material dispersed in the second polymer electrolyte.

An exemplary embodiment discloses a method of manufacturing a conductive layered structure. The method may include: preparing a DNA hydrogel; immersing the DNA hydrogel in a first polymer electrolyte solution having a polarity opposite to the DNA hydrogel, thereby forming a DNA hydrogel with the first polymer solution disposed on a surface of the hydrogel; and drying the DNA hydrogel with the first polymer electrolyte solution, thereby forming a first polymer electrolyte layer disposed on the surface of the DNA hydrogel. The DNA hydrogel having the first polymer electrolyte layer disposed on the DNA hydrogel may be immersed in a second polymer electrolyte solution having an opposite polarity to the first polymer electrolyte layer, thereby forming a DNA hydrogel with the first polymer layer disposed on the surface of the DNA hydrogel and the second polymer electrolyte solution disposed on the first polymer layer. Then the immersed DNA hydrogel with the first polymer electrolyte layer and the second polymer electrolyte solution may be dried, thereby forming a second polymer electrolyte layer disposed on the first polymer electrolyte layer which is further disposed on the DNA hydrogel, wherein the second polymer electrolyte layer is a composite layer comprising a conductive material dispersed in the second polymer electrolyte.

According to an exemplary embodiment, immersing the DNA hydrogel with the second polymer electrolyte layer in a third polymer electrolyte solution having a polarity opposite to the second polymer electrolyte layer; and drying the immersed DNA hydrogel with the second polymer electrolyte layer to form a third polymer electrolyte layer on the second polymer electrolyte layer on the DNA hydrogel may be repeated to form an additional polymer electrolyte layer, wherein at least one layer of the additional polymer electrolyte layer may be a composite layer in which a conductive material is dispersed in a polymer electrolyte.

An exemplary embodiment discloses a supercapacitor including: a cathode; an anode; and an electrolyte disposed between the cathode and the anode. At least one of the cathode and the anode may be an electrode comprising a current collector and an electrode active material disposed on the current collector. The electrode active material may include: a DNA hydrogel; and a composite layer comprising a polymer electrolyte and a conductive material, the composite layer being disposed on the DNA hydrogel.

The foregoing general description and the following detailed description are only exemplary and explanatory and they are intended to provide further explanation of the invention as claimed.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
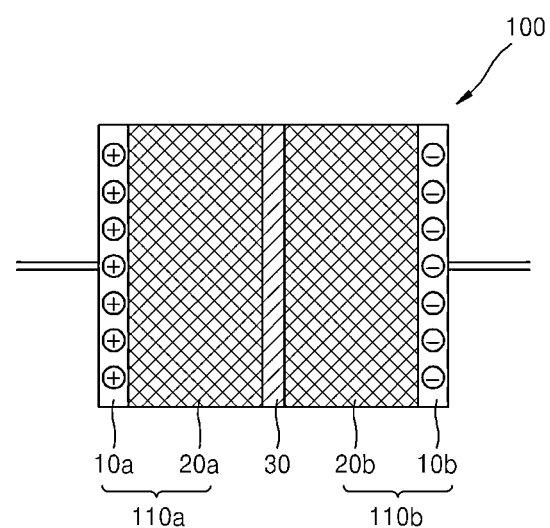
FIG. 1 is a schematic view of a supercapacitor according to an embodiment of the present inventive concept.

Reference will now be made in detail to embodiments of a conductive layered structure, an electrode and a supercapacitor that include the conductive layered structure, and a method of manufacturing the conductive layered structure, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by As shown in the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ).

The use of the terms "first", "second", and the like does not imply any particular order, but they are included to identify individual elements. Moreover, the use of the terms first, second, etc. does not denote any order or importance, but rather the terms first, second, etc. are used to distinguish one element from another.

Although some features may be described with respect to individual exemplary embodiments, aspects need not be limited thereto such that features from one or more exemplary embodiments may be combinable with other features from one or more exemplary embodiments.

According to an embodiment of the present inventive concept, a conductive layered structure includes: a DNA hydrogel; and a composite layer including a polymer electrolyte and a conductive material, the composite layer being disposed on the DNA hydrogel.

The DNA hydrogel has a 3-dimensional porous structure which may be formed by cross-linking branched DNA. The branched DNA may be X-shaped branched DNA, Y-shaped branched DNA, or T-shaped branched DNA.

The size and shape of the DNA hydrogel may be precisely controlled by adjusting an initial concentration and type of the branched DNA.

The DNA hydrogel may have a very thin planar or leaf-shaped layered porous structure having a thickness of several nanometers to several hundreds of nanometers. The DNA hydrogel may be negatively charged due to a phosphate group in the DNA backbone.

The composite layer of a polymer electrolyte and a conductive material may have a multi-layer structure including 2 to 20 layers. The multi-layer structure may be disposed on both sides to be symmetrical with respect to the DNA hydrogel. In this regard, the composite layer may include a conductive material uniformly dispersed on and/or in the polymer electrolyte. The conductive material may be a conductive polymer or a carbon nanotube.

When the composite layer has a multi-layer structure, the conductive material may be dispersed in at least one polymer electrolyte. In particular, all the layers in the composite layer may include a conductive material dispersed in polymer electrolyte. In some embodiments, some layers in the composite layer may include a conductive material dispersed in polymer electrolyte, and the rest of the layers may include only polymer electrolyte without a conductive material.

The DNA hydrogel and the composite layer may be bound to each other by electrostatic attraction. In particular, the DNA hydrogel may be negatively charged due to the presence of phosphate groups, and thus may be stably bound by electrostatic attraction with the composite layer thereon if the polymer electrolyte in the composite layer has positive charges.

When the composite layer has a multi-layer structure, the layers in the composite layer may also be bound together by electrostatic attraction. That is, when the DNA hydrogel is negatively charged, a first composite layer containing a polymer electrolyte having positive charges may be bound directly to the DNA hydrogel by electrostatic attraction, and a second composite layer containing a polymer electrolyte having negative charges may be disposed on the first composite layer by electrostatic attraction, so that a layer-by-layer assembly as an alternate stack of positive-charged layers and negatively-charged layers may be formed by electrostatic attraction.

In some embodiments, when the conductive layered structure is manufactured using a DNA hydrogel as a template and the DNA hydrogel has a large specific surface area and high biocompatibility, since a conductive material may not be directly on the DNA hydrogel, at least one layer of polymer electrolyte may be disposed to contact the DNA hydrogel, wherein a conductive material is dispersed in the at least one of polymer electrolyte.

The larger the number of the composite layers, the higher the conductive material content, and the conductivity of the conductive layered structure. However, an increased weight of the multi-layered structure with a larger number of composite layers may lead to a lower conductivity. Thus, the number of composite layers may be appropriately controlled. For example, the composite layer may include, for example, 2 to 20 layers.

The polymer electrolyte having positive charges may be at least one selected from among (poly(diallyldimethyl ammonium chloride) (PDADMAC), poly(allylamine hydrochloride) (PAH), poly(ethyleneimine) (PEI), and poly(dimethylamino-2-ethyl methacrylate) (PDMAEMA).

The polymer electrolyte having negative charges is at least one selected from among poly(styrene sulfonate) (PSS), poly(acrylic acid) (PAA), poly(vinylsulfonate) (PVS), and poly[1-[4-(3-carboxy-4-hydroxyphenylazo)benzenesulfonamido]-1,2-ethanediyl, sodium salt] (PAZO).

The conductive material may be a conductive polymer, carbon nanotube, or a reduced graphene oxide. The conductive polymer may be water-dispersible. Due to being water-dispersible, the conductive polymer may be uniformly dispersible in an aqueous polymer electrolyte solution. That is, to avoid difficulties in forming a conductive polymer layer directly on the DNA hydrogel, after forming a polymer electrolyte layer on the DNA hydrogel by electrostatic attraction, a conductive polymer may be dispersed on the polymer electrolyte layer, thereby manufacturing a conductive layered structure.

The conductive polymer may be at least one selected from among polyaniline, polythiophene, polypyrrole, and poly(3,4-ethylene dioxythiophene).

The carbon nanotube may be a single-walled carbon nanotube or a multi-walled carbon nanotube.

When the conductive material is a carbon nanotube, the layered structure may further include polyaniline (PANI) on the polymer electrolyte layer including the carbon nanotube.

In some embodiments, since the conductive layer structure has a large specific surface area and a high conductivity, the conductive layered structure may be used as electrodes and in applications such as energy storage devices, supercapacitors, lithium ion batteries, or fuel cells.

According to another embodiment of the present inventive concept, an electrode includes: a current collector; and an electrode active material disposed on the current collector. The electrode active material may include: a DNA hydrogel; and a composite layer including a polymer electrolyte and a conductive material, the composite layer being disposed on the DNA hydrogel.

In some embodiments, by using a porous DNA hydrogel as a template, a composite layer of a polymer electrolyte and a conductive material may be formed on the porous DNA hydrogel to obtain a conductive material having a very large specific surface area to be used as an electrode.

In the electrode, the DNA hydrogel and the composite layer may be bound to each other by electrostatic attraction. The composite layer may have a multi-layer structure including 2 to 20 layers. The multi-layer structure may be on both sides to be symmetrical with respect to the DNA hydrogel.

The composite layer of the electrode may be an alternate stack of a polymer electrolyte layer having positive charges and a polymer electrolyte layer having negative charges, wherein the conductive material is dispersed in at least one layer in the composite layer. The conductive material may be a conductive polymer or a carbon nanotube. When the composite layer has a multi-layer structure, the layers in the composite layer may also be bound together by electrostatic attraction.

In some embodiments, when the electrode is for a supercapacitor, for example, an implantable supercapacitor, the current collector may be a biocompatible current collector.

In some embodiments, the biocompatible current collector of the electrode may include at least one metal selected from among Au, Ag, Pt, Ti, and Fe.

In some embodiments, the electrode for an implantable supercapacitor may be manufactured using a DNA hydrogel, and thus may be biocompatible and implantable.

According to another embodiment of the present inventive concept, a supercapacitor includes a cathode, an anode, and an electrolyte disposed between the cathode and the anode. At least one of the cathode and the anode may be the above-described electrode.

In some embodiments, the supercapacitor may further include a separator. The cathode of the supercapacitor may be the above-described electrode. The anode of the supercapacitor may be the same as the cathode or may be different from the cathode. The anode may be any anode known in the art.

FIG. 1 is a schematic view of a supercapacitor 100 according to an embodiment of the present inventive concept.

As shown in FIG. 1, the supercapacitor 100 includes a first electrode 110a having a first current collector 10a and a first active layer 20a, a separator 30, a second electrode 110b having a second current collector 10b and a second active layer 20b, and an electrolyte (not shown) filling the first active layer 20a and the second active layer 20b. The first electrode 110a and the second electrode 110b may be symmetrical with respect to the separator 30, and may have the same structure and characteristics. Hereinafter, only the first electrode 110a will be described in greater detail. The following description of the first electrode 110a may be referred to as description of the second electrode 110b.

The first electrode 110a may include the first current collector 10a and the first active layer 20a. The first current collector 10a may collect electrons from the first active layer 20a or may supply electrons to the first active layer 20a. The first current collector 10a may be formed of a metal having high electric conductivity, for example, aluminum, nickel, copper, or titanium, but not limited thereto. The first current collector 10a may collect electrons from the first active layer 20a or may supply electrons to the first active layer 20a, and may be biocompatible. The first current collector 10a may be formed of a metal having high electric conductivity, for example, gold, silver, platinum, titanium, or iron, but not limited thereto.

The first active layer 20a may be disposed on the first current collector 10a. The first active layer 20a may include a DNA hydrogel, and a composite layer including a polymer electrolyte and a conductive material, the composite layer being disposed on the DNA hydrogel.

When a voltage is applied to the first active layer 20a filled with the electrolyte, the electrolyte is separated into cations and anions. The separated cations and anions of the electrolyte may migrate to the first electrode 110a and the second electrode 110b, respectively, to form an electric double layer.

If unfolding the first electrode 110a and the second electrode 110b of the supercapacitor 100 of FIG. 1 having the electric double layer on a plane, the first electrode 110a and the second electrode 110b may be assumed as electrodes of a common capacitor disposed parallel to each other. Accordingly, a charge capacitance of the supercapacitor 100 of FIG. 1 having the electric double layer may be determined using Equation 1 below.

$$C = \varepsilon \frac{A}{d} \quad \text{[Equation 1]}$$

Where C is a capacitance, ε is a dielectric constant of an electrode material, A is a specific surface area of the electrode, and d is a thickness of the electric double layer. The thickness (d) of the electric double layer may be from about 0.2 nm to about 1 nm. The specific surface area (A) of the electrode refers to a contact area of the electrode and electrolyte ions. Of the above factors determining the charge capacitance (C), the dielectric constant (ε) of the electrode material and the thickness (d) of the electric double layer are limited by the materials. Accordingly, controlling the specific surface area (A) of the electrode may be a more effective way to obtain a high capacitance.

In some embodiments, the supercapacitor may have a high capacitance with a large specific surface area since the porous structure of the DNA hydrogel may be kept after the formation of the multi-layer structured composite layer.

In some embodiments, the supercapacitor may be an implantable supercapacitor that is free of cytotoxicity and is stably operable in physiological environments, i.e., environments including biological cells. The supercapacitor may be implantable in a human organ.

Furthermore, due to the ability to store and use energy through physical adsorption and desorption of ions, the supercapacitor may be nearly free of toxicity even after repeated operations in physiological environments. Accordingly, the supercapacitor may be implemented as a biocompatible energy storage device implantable in a human organ.

The electrolyte between the cathode and the anode may be in liquid form dissolved in a solvent. The solvent of the electrolyte may be at least one selected from acetonitrile, dimethyl ketone, and propylene carbonate. The electrolyte may have a solubility of about 0.01 mole/L in the solvent, and may be electrically inactive in an operating voltage range of the supercapacitor.

The electrolyte may be at least one of $H_2SO_4$, $Na_2SO_4$, $Li_2SO_4$, $LiPF_6$, lithium perchlorate, lithium tetrafluoroborate, KCl, KOH, and 1-ethyl-3-methylimidazolium bis(trifluoromethylsulfonyl)imide (EMIM/TFSI).

The separator 30 may divide an inner space of the supercapacitor into the cathode and the anode, and prevent electrical short circuit between the cathode and the anode. The separator 30 may be formed of, for example, polypropylene, polyethylene, or Teflon, but not limited thereto.

In some embodiments, the supercapacitor may be an implantable supercapacitor including a cathode, an anode, and a biocompatible separator disposed between the cathode and the anode. At least one of the cathode and the anode may be the above-described implantable electrode.

The biocompatible separator may divide an inner space of the supercapacitor into the cathode and the anode, and prevent electrical short circuit between the cathode and the anode. The biocompatible separator may be formed of, for example, polypropylene, polyethylene, Teflon, cellulose, or hydrogel, but not limited thereto.

In some embodiments, the implantable separator may be implantable in a human organ, such as the bladder or eyeball.

In some other embodiments, the implantable separator may further include an insulating protection layer coating the cathode, the anode, and the biocompatible separator from neighboring environments.

The insulating protection layer may include a biocompatible material selected from the group consisting of cellulose, hydrogel, and a combination thereof.

The insulating protection layer may have a thickness of from about 1 μm to about 1000 μm.

In some embodiments of the implantable supercapacitor, unlike electrolytes of common supercapacitors, ions in the biofluid of a human organ in which the implantable supercapacitor is implanted may function as electrolyte. When a voltage is applied to the human organ from an external power supply unit, the ions in the biofluid of the human organ including the supercapacitor migrate to the cathode and the anode of the implanted supercapacitor to form an electric double layer for charging and discharging.

According to another embodiment of the present inventive concept, a method of manufacturing a conductive layered structure may include: preparing a DNA hydrogel; immersing the DNA hydrogel in a first polymer electrolyte solution having a polarity opposite to the DNA hydrogel, thereby forming a DNA hydrogel with the first polymer solution disposed on a surface of the hydrogel. Then drying the DNA hydrogel with the first polymer electrolyte solution disposed on the hydrogel to form a first polymer electrolyte layer disposed on the DNA hydrogel. A conductive material may be dispersed in the first polymer electrolyte solution. The DNA hydrogel with the first polymer electrolyte layer may be further immersed in a second polymer electrolyte solution having a polarity opposite to the first polymer electrolyte layer. The immersed DNA hydrogel with the first polymer electrolyte layer and the second polymer electrolyte may be dried, thereby forming a second polymer electrolyte layer disposed on the first polymer electrolyte layer which is further disposed on the DNA hydrogel. The second polymer electrolyte layer may be a composite layer including a conductive material dispersed in the second polymer electrolyte/layer.

Figure 2A:
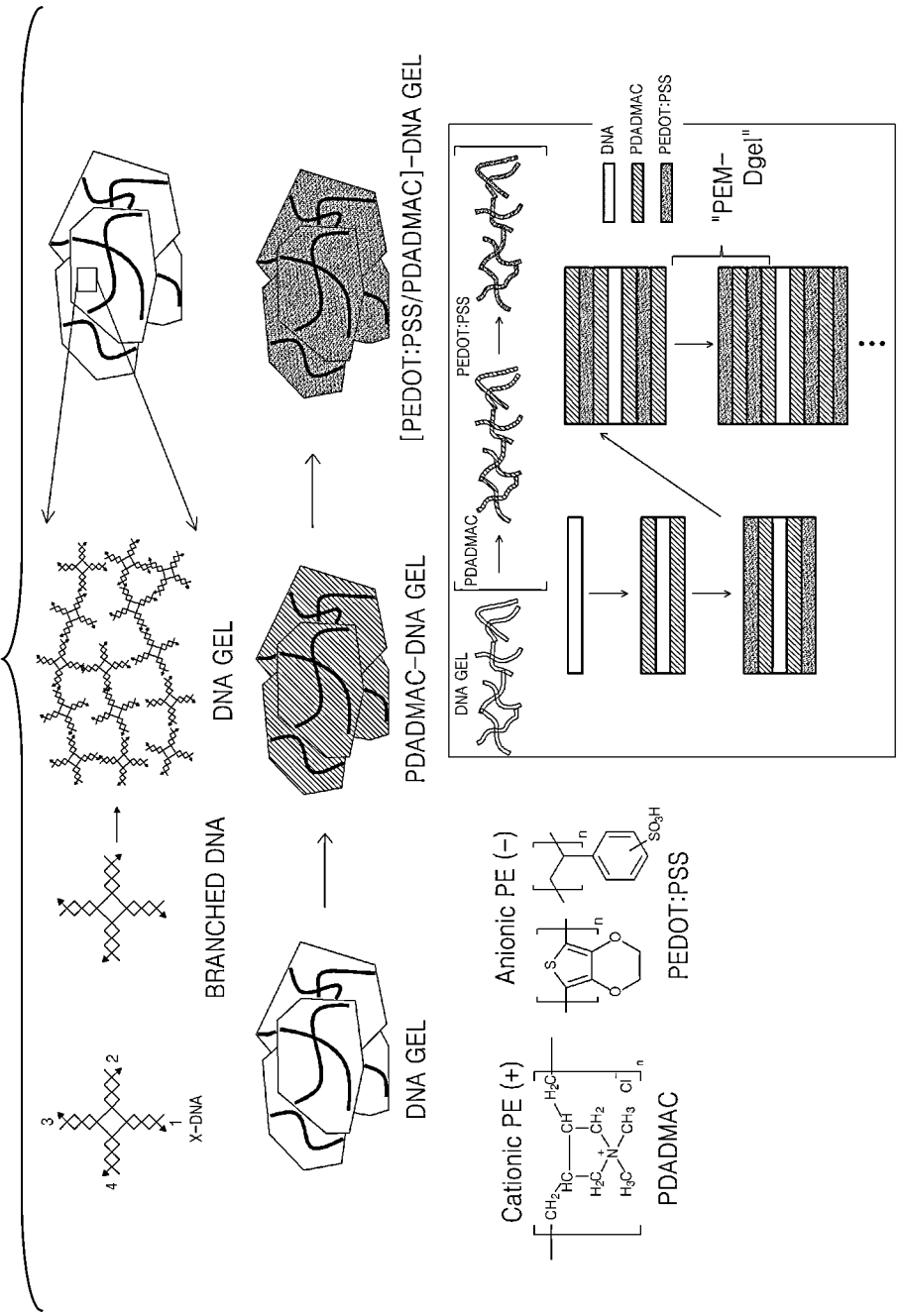
FIG. 2A is a schematic view illustrating a manufacturing process of a conductive layered structure, according to an embodiment of the present inventive concept
Figure 2B:
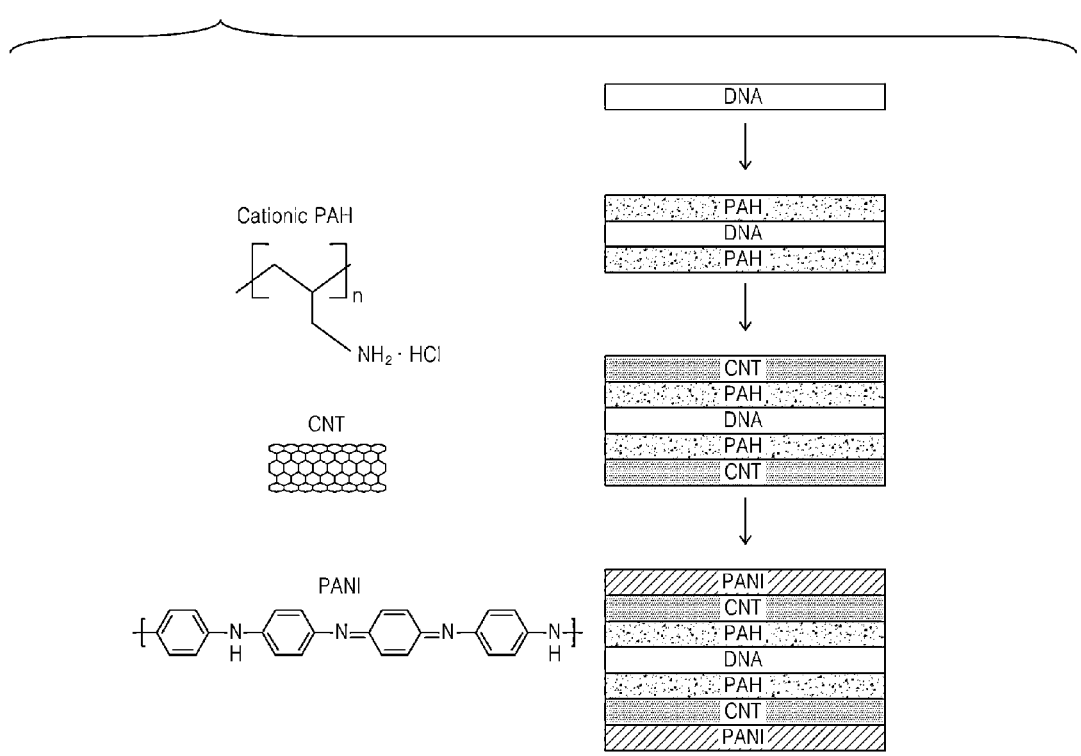
FIG. 2B illustrates a manufacturing process of a conductive layered structure according to another embodiment of the present inventive concept.

FIG. 2A is a schematic view illustrating a manufacturing process of a conductive layered structure, according to an embodiment of the present inventive concept and FIG. 2B illustrates a manufacturing process of a conductive layered structure according to another embodiment of the present inventive concept.

In some embodiments, the method may further include: immersing the DNA hydrogel with the first polymer electrolyte layer, for example, a layer including PDADMAC in a solution in which a second polymer electrolyte, for example, PEDOT:PSS is dissolved, having a polarity opposite to the first polymer electrolyte layer formed on the DNA hydrogel; and drying the DNA hydrogel containing the first polymer electrolyte solution to form a second polymer electrolyte layer on the DNA hydrogel with the first polymer electrolyte layer.

According to another embodiment of the present inventive concept, the method may include immersing a DNA hydrogel with the first polymer electrolyte layer, for example, a layer including PDADMAC in a solution in which a second polymer electrolyte in which a conductive material is dispersed, for example, SWCNT:PAH, having a polarity opposite to the first polymer electrolyte layer formed on the DNA hydrogel; and drying the DNA hydrogel with the first polymer electrolyte layer to form a second polymer electrolyte layer on the first electrolyte layer on the DNA hydrogel. Here, when the conductive material included in the second polymer electrolyte layer is SWCNT, a PANI layer may be formed on the second polymer electrolyte layer.

According to another embodiment of the present inventive concept, the steps of immersing a DNA hydrogel with the second polymer electrolyte layer in a third polymer electrolyte solution having a polarity opposite to the second polymer electrolyte layer; and drying the immersed DNA hydrogel with the second polymer electrolyte layer to form a third polymer electrolyte layer on the second polymer electrolyte layer on the DNA hydrogel may be repeated to form an additional polymer electrolyte layer. The one or more layers of the additional polymer electrolyte layers may be a composite layer in which a conductive material is dispersed in a polymer electrolyte.

A plurality of polymer electrolytes included in the additional polymer electrolyte layers may be made to be the same as each other or different from each other.

The DNA hydrogel may be prepared by obtaining branched DNA by hybridization of a single-stranded DNA, and cross-linking the branched DNA.

The branched DNA may be designed and synthesized to have arms with complementary sticky terminals. A length of each arm of the branched DNA may be adjusted. The branched DNA may be cross-linked together using a T4 ligase to form a DNA hydrogel (also referred to as a DNA gel or Dgel) having a 3-dimensional structure. Methods of preparing DNA hydrogels are disclosed in a document (Letters, 2006.9.24. pp 797-801, Enzyme-catalysed assembly of DNA hydrogel), which is incorporated herein by reference.

The branched DNA may be an X-shaped branched DNA, a Y-shaped branched DNA, or a T-shaped branched DNA.

The DNA hydrogel may be immersed in a polymer electrolyte solution to bind the polymer electrolyte onto the DNA hydrogel by electrostatic attraction. For example, when the DNA hydrogel has negative charges, the DNA hydrogel may be immersed in a polymer electrolyte solution having positive charges to bind the polymer electrolyte onto the DNA hydrogel by electrostatic attraction.

The immersing may be performed through dipping, washing, and freeze-drying. For example, the immersing may be performed using a well-known polymer layer-by-layer (LBL) method.

After the DNA hydrogel is removed from the polymer electrolyte solution, the DNA hydrogel bound with the polymer electrolyte may be dried to form the polymer electrolyte layer on the DNA hydrogel.

The method may include washing before the drying. The washing may reduce the thickness of the polymer electrolyte layer bound on the DNA hydrogel. For example, the DNA hydrogel bound with the polymer electrolyte may be washed using distilled water.

The conductive material may be a conductive polymer and may have high dispersibility in the polymer electrolyte solution. The conductive material may be water-dispersible. The conductive polymer may be at least one of polyaniline, polythiophene, polypyrrole, and poly(3,4-ethylene dioxythiophene.

A carbon nanotube may be used as the conductive material. A single-walled carbon nanotube or a multi-walled carbon nanotube may be used as the carbon nanotube.

The drying may be performed by freeze-drying. The freeze-drying may be performed at a temperature of about −60° to about −80° for about 12 hours to about 24 hours. The freeze-drying may prevent the layered structure including the DNA hydrogel and the composite layer of the polymer electrolyte and conductive material from damage.

The concentration of the polymer electrolyte solution may be about 10 mM to about 100 mM and the amount of the conductive polymer used may be about 0.5 wt % to about 2.0 wt %.

As the polymer electrolyte solution in which the conductive polymer is dispersed, a commercially available 1 wt % PEDOT/PSS solution may be used.

When a carbon nanotube is used as a conductive material, PAH may be used as a polymer electrolyte.

A carbon nanotube may be negatively charged to improve dispersibility of the carbon nanotube in a polymer electrolyte. Any method of negatively charging the carbon nanotube may be used, for example, a method of mixing a dispersing agent such as SDBS and PAA with a single-walled carbon nanotube may be used. Here, relative amounts used may be, for example, CNT:SDBS=1:2 (w:w).

On the other hand, when a carbon nanotube is used as a conductive material, PANI may be used to improve capacitance through a Faradaic reaction.

PANI is one of pseudocapacitance materials and is a polymer and thus, is capable of a solution process in contrary to other inorganic pseudocapacitance materials such as $MnO_2$ and $RuO_2$. Furthermore, PANI may be positively charged according to pH, and thus, is a conductive polymer that may be used in an LBL process. About 5 mg/ml to about 40 mg/ml of PANI solution may be used to form a PANI layer.

When a thickness of the PANI layer is too thick, conductivity of a layered structure may decrease due to low conductivity of the PANI itself.

On the other hand, internal resistance may differ according to pH during a manufacturing process of a solution including the PANI and thus, the lower the pH, the lower the internal resistance of the PANI and the pH may be about 1.0 to about 2.0.

In manufacturing the conductive layered structure, a pH of the polymer electrolyte solution may be adjusted to control the quantity of charges in the polymer electrolyte, thereby facilitating binding between the layers.

The steps for forming the polymer electrolyte layer on the DNA hydrogel may be repeated to form a multi-layered structure including one or more composite layers of the polymer electrolyte including a conductive material on the DNA hydrogel.

For example, a DNA hydrogel with a positively charged polymer electrolyte layer and a conductive material may be immersed in a solution including a negatively-charged polymer electrolyte and a conductive material and then dried to form a conductive layered structure in which the positively charged polymer electrolyte layer, and a composite layer of the negatively charged polymer electrolyte and the conductive material are sequentially formed on the DNA hydrogel. These processes may be repeated to obtain a conductive layered structure having an intended number of layers. The solution including the polymer electrolyte used herein may include the same or a different polymer electrolyte and may include or may not include a conductive material.

When the composite layer has a multi-layer structure, the composite layer may be disposed on both sides to be symmetrical with respect to the DNA hydrogel. The composite layer may be disposed on both sides of the planar or leaf-shaped layers of the DNA hydrogel.

The conductive material may be in all or some of the layers in the multi-layered composite layer.

The polymer electrolyte having positive charges may be at least one selected from among (poly(diallyldimethyl ammonium chloride) (PDADMAC), poly(allylamine hydrochloride) (PAH), poly(ethyleneimine) (PEI), and poly(dimethylamino-2-ethyl methacrylate) (PDMAEMA).

The polymer electrolyte having negative charges may be at least one selected from among poly(styrene sulfonate) (PSS), poly(acrylic acid) (PAA), poly(vinylsulfonate) (PVS), and poly[1-[4-(3-carboxy-4-hydroxyphenylazo)benzenesulfonamido]-1,2-ethanediyl, sodium salt] (PAZO).

In some embodiments of the method of manufacturing a conductive layered structure, a DNA hydrogel having a large specific surface may be used as a template. A conductive material may be coated on the DNA hydrogel by conformal coating, for example, using a layer-by-layer assembly method, to form a conductive layered structure with a large specific surface area. The conductive layered structure may have the same or similar porous structure as the DNA hydrogel. The conductive layered structure with highly uniform conductive coatings may be obtained through simple dip coating and drying processes.

The conductive layered structure including the DNA hydrogel and the composite layer of the polymer electrolyte and the conductive material on the DNA hydrogel may be used as an electrode active material for an implantable electrode. For example, an implantable electrode may be manufactured using the electrode active material, according to a common electrode manufacturing method, for example, by preparing a slurry of the electrode active material, coating the slurry on a biocompatible current collector, and freeze-drying a resulting product.

According to another embodiment of the present inventive concept, an in-vivo electronic device includes the conductive layered structure according to the above-described one or more embodiments of the present inventive concept. Using the conductive layered structure manufactured using a DNA hydrogel as a template, the in-vivo electronic device is biocompatible and is implantable in any of a variety of human organs, for example, in muscle cells.

Thereinafter, one or more exemplary embodiments will be described in detail with reference to the following examples. However, these examples are not intended to limit the scope of the one or more exemplary embodiments.

Preparation Example 1

Preparation of DNA Hydrogel

Figure 3A:
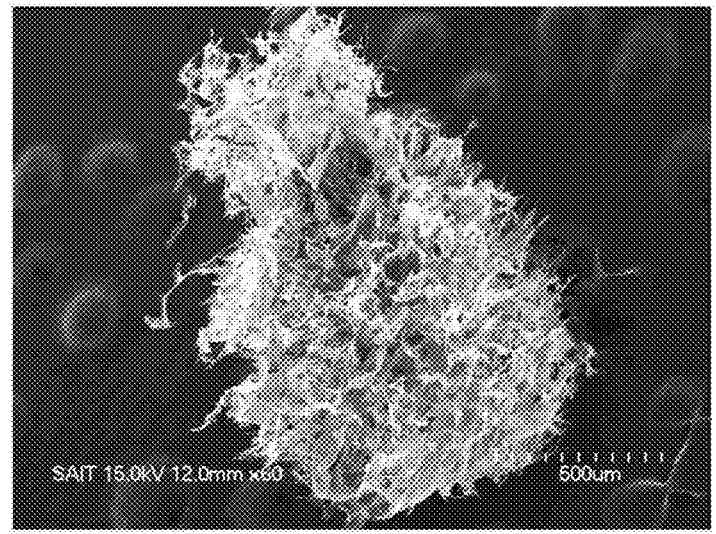
FIG. 3A is a scanning electron microscopic (SEM) image of a DNA hydrogel manufactured in Preparation Example 1 and FIG. 3B is a magnified SEM image of FIG. 3A.
Figure 3B:
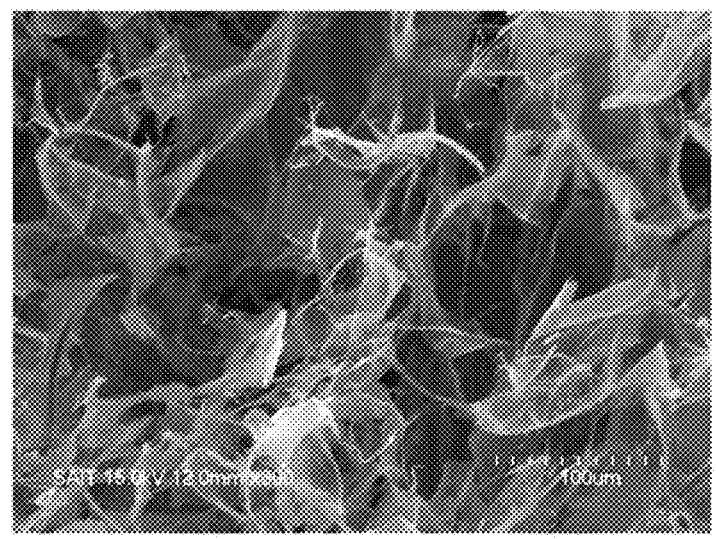

X-shaped branched DNA was obtained by hybridizing single-stranded DNA. A length of each arm was about 6 nm. The X-shaped branched DNA was mixed with six units of T4-ligase, and stirred at about 16° C. for about 12 hours to obtain a DNA hydrogel. The single-stranded DNA was provided by Bioneer and 10 nmol of X-shaped monomer was hybridized by T4 DNA ligase(Promega) at 16° C. for 12 hours. FIGS. 3A and 3B are scanning electron microscopic (SEM) images of the DNA hydrogel at a magnification of ×60 and ×300, respectively.

As shown in FIGS. 3A and 3B, the DNA hydrogel had a very thin planar or leaf-shaped layered porous structure having a thickness of several nanometers to several hundreds of nanometers. The DNA hydrogel had negative charges due to a phosphate group in the DNA backbone.

Example 1

Manufacture of Conductive Layered Structure

The DNA hydrogel prepared in Preparation Example 1 was dipped in an aqueous solution of poly(diallyldimethylammunium chloride)(PDADMAC) (20 mM) as a positively charged polymer at room temperature for about 30 minutes. Afterward, the DNA hydrogel was removed from the solution, washed with distilled water, and then freeze-dried at about −80° C. for about 12 hours to have a PDADMAC layer deposited thereon. The DNA hydrogel with the PDADMAC layer was dipped in an aqueous solution of poly(styrenesulfonate) (PSS) (1 wt %) as a negatively charged polymer, poly(3,4-ethylenedioxythiophene (PEDOT) being dispersed in the aqueous solution, at room temperature for about 30 minutes. Afterward, the DNA hydrogel was removed from the solution, washed with distilled water, and then freeze-dried at about −80° C. for about 12 hours to obtain a stacked structure with a composite layer of the PDAMAC layer/PEDOT-PSS layer on opposite surfaces of the DNA hydrogel (i.e., a composite layer of the PDAMAC layer and the PEDOT-PSS layer on opposite surfaces of the DNA hydrogel). "Poly(diallyldimethylammunium chloride)(PDADMAC)" having a molecular weight of 100,000~200,000(Aldrich), PEDOT: PSS (Heraeus) were used.

Figure 4:
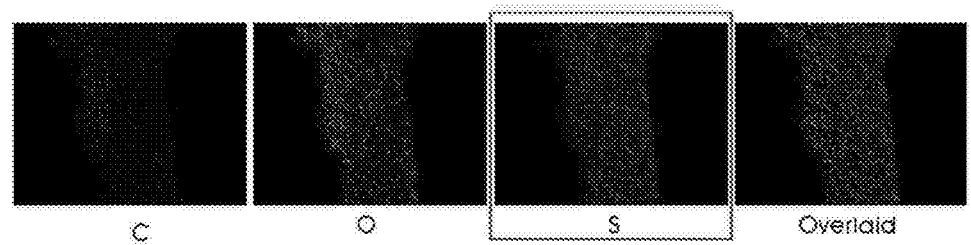
FIG. 4 illustrates images obtained by performing energy dispersive spectroscopy (EDS) mapping on a conductive layered structure of Preparation Example 1.
Figure 5:
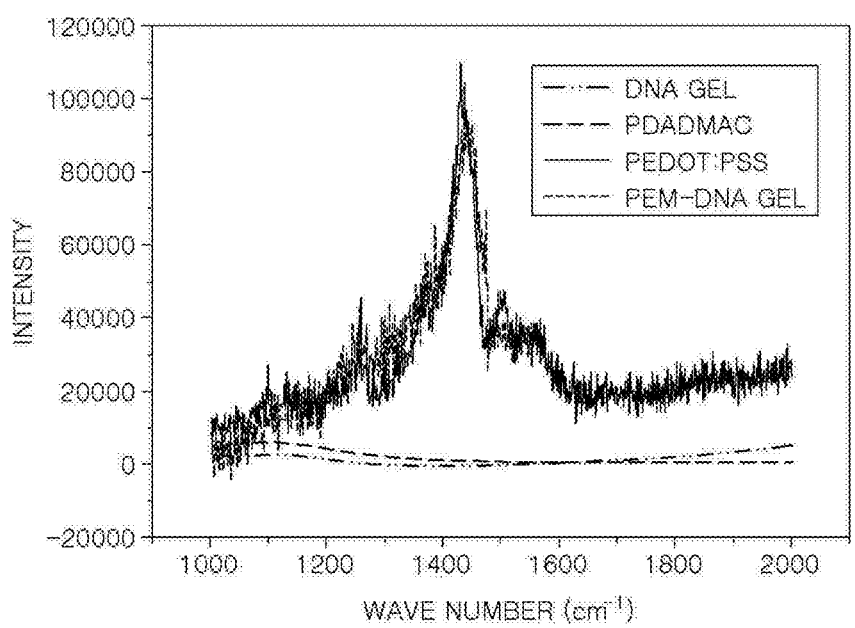
FIG. 5 is a Raman spectrum of the conductive layered structure of Preparation Example 1.
Figure 6A:
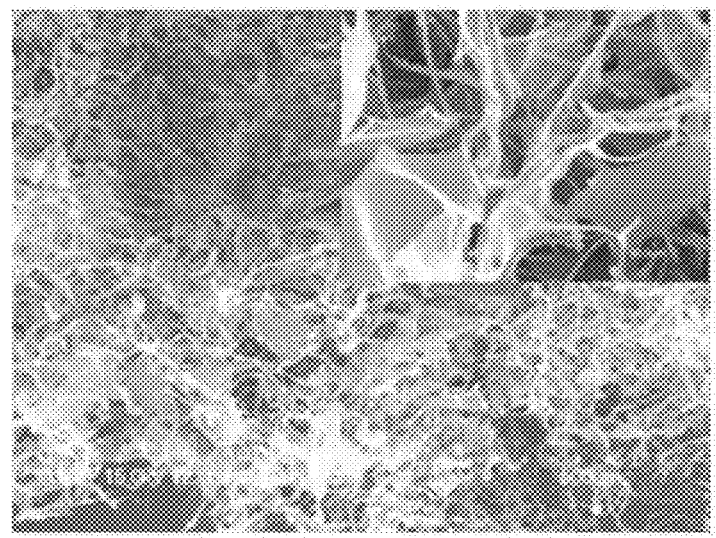
FIGS. 6A to 6E are SEM images of the conductive layered structures prepared in Examples 1 to 5, respectively.
Figure 6B:
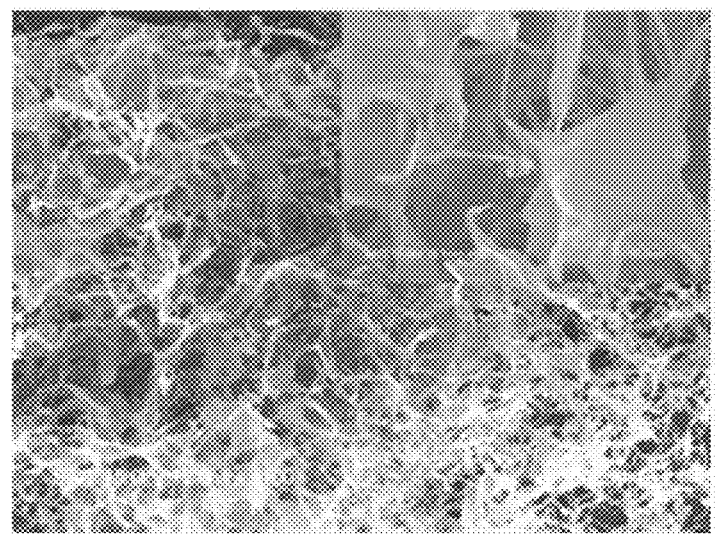
Figure 6C:
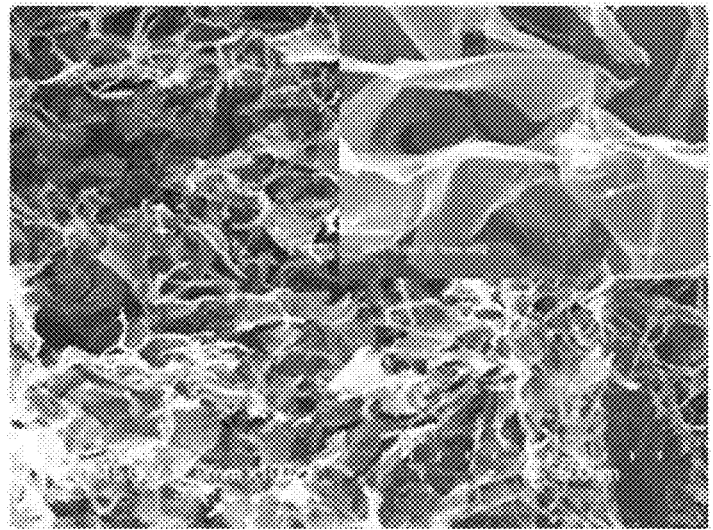
Figure 6D:
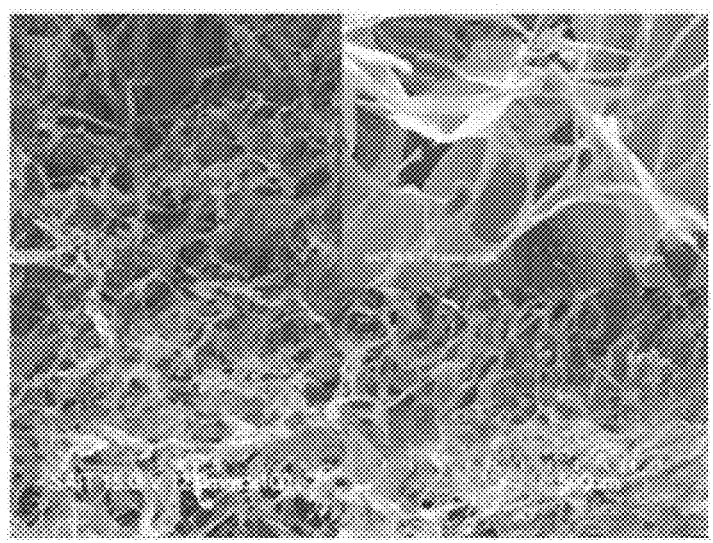
Figure 6E:
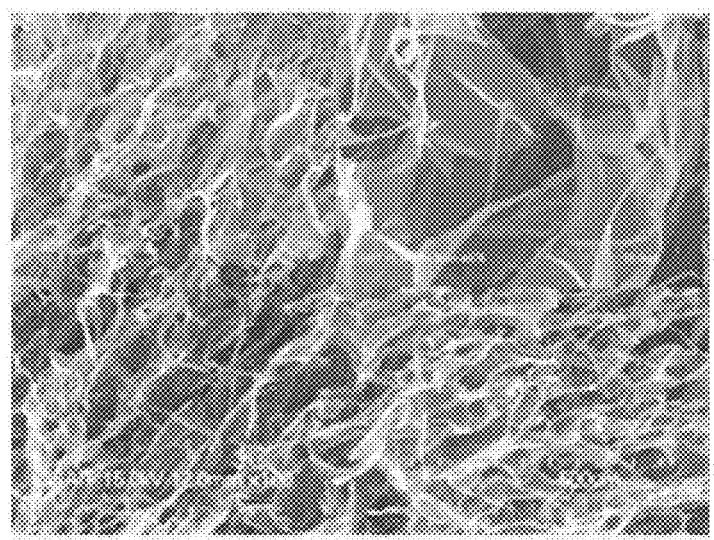

FIG. 4 illustrates images obtained by performing energy dispersive spectroscopy (EDS) mapping. As shown in FIG. 4, leaf-like regions of the DNA hydrogel were found to be uniformly coated with uniformly distributed conductive PEDOT. FIG. 5 illustrates Raman spectra of the above-described stacked structure. As shown in FIG. 5, the conductive material PEDOT was found to be macroscopically seen.

Example 2

The stacked structure of Example 1 was dipped in an aqueous solution of PDADMAC (20 mM) as a positively charged polymer at room temperature for about 30 minutes. Afterward, the DNA hydrogel was removed from the solution, washed with distilled water, and then freeze-dried at about −80° C. for about 12 hours to form a composite layer of PDAMAC layer/PEDOT-PSS layer/PDAMAC layer on the DNA hydrogel.

The stacked structure was dipped in an aqueous solution of PSS (1 wt %) as a negatively charged polymer, PEDOT being dispersed in the aqueous solution, at room temperature for about 30 minutes. Afterward, the DNA hydrogel was removed from the solution, washed with distilled water, and then freeze-dried at about −80° C. for about 12 hours to obtain a stacked structure with a composite layer of the PDAMAC layer/PEDOT-PSS layer/PDAMAC layer/PEDOT-PSS layer on opposite surfaces of the DNA hydrogel.

Example 3

The same process as in Example 2 was repeated on the stacked structure of Example 2 to form a stacked structure with a composite layer of the PDAMAC layer/PEDOT-PSS layer/PDAMAC layer/PEDOT-PSS layer/PDAMAC layer/PEDOT-PSS layer on opposite surfaces of the DNA hydrogel.

Example 4

The same process as in Example 3 was repeated on the stacked structure of Example 3 to form a stacked structure with a composite layer of the PDAMAC layer/PEDOT-PSS layer/PDAMAC layer/PEDOT-PSS layer/PDAMAC layer/PEDOT-PSS layer/PDAMAC layer/PEDOT-PSS layer on opposite surfaces of the DNA hydrogel.

Example 5

The same process as in Example 4 was repeated on the stacked structure of Example 4 to form a stacked structure with a composite layer of the PDAMAC layer/PEDOT-PSS layer/PDAMAC layer/PEDOT-PSS layer/PDAMAC layer/PEDOT-PSS layer/PDAMAC layer/PEDOT-PSS layer/PDAMAC layer/PEDOT-PSS layer on opposite surfaces of the DNA hydrogel.

FIGS. 6A to 6E are SEM images of the conductive layered structures of Examples 1 to 5, illustrating morphology change with respect to the number of layers in the conductive layered structures.

As shown in FIGS. 6A to 6E, the overall layered porous structures were maintained constant independent of the number of composite layers including conductive polymer and polymer electrolyte. This is attributed to a very thin thickness of each layer. The constant porous structure without pore reduction is very crucial for maintaining a larger specific surface area.

Preparation Example 2

Preparing SDBS-SWCNT 15 mg of SWCNT (Iljin CNT) was added to SDBS (Aldrich, 30 mg) and then sonicated to obtain SWCNT dispersed in a negatively charged electrolyte.

Figure 7A:
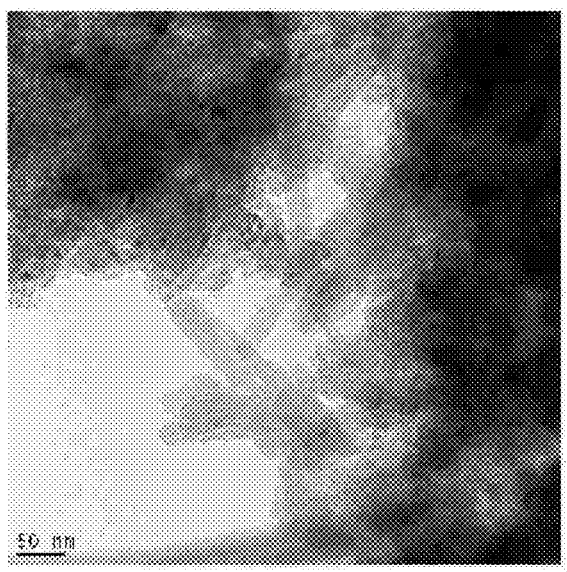
FIGS. 7A and 7B are TEM images before and after SDBS is bonded to SWCNT and FIG. 7C is an SEM image after bonding the SDBS as in Preparation Example 2.
Figure 7B:
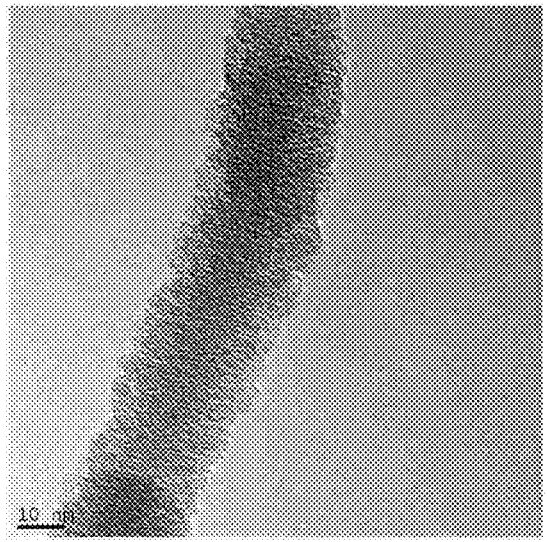
Figure 7C:
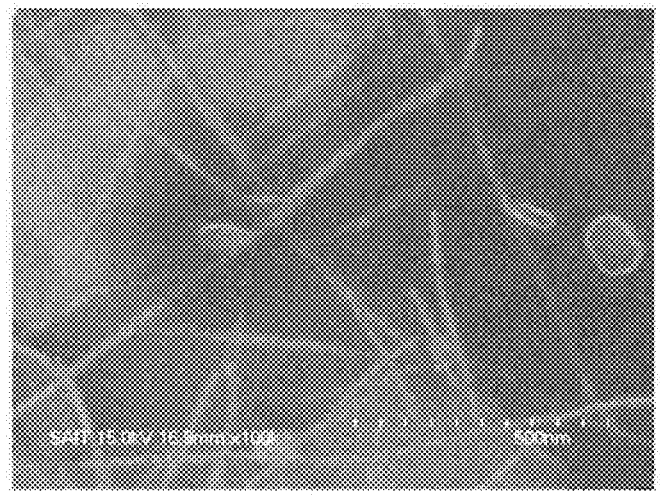

FIG. 7A is a TEM image after dispersing SWCNT in SDBS and FIG. 7B is a magnified image of 7A. As shown in FIGS. 7A and 7B, SDBS is uniformly and thoroughly bonded to the SWCNT. FIG. 7C is an SEM image after SDBS is bonded. As shown in FIG. 7C, it may be confirmed that diameters of CNT bundles dispersed overall are generally uniform.

Preparation Example 3

Preparing PAA-SWCNT 15 mg of CNT was dispersed in 200 mg/ml of PAA (available from Aldrich) aqueous solution to prepare SWCNT dispersed in a negatively charged electrolyte. The volume of the aqueous solution was 3 ml.

Figure 8A:
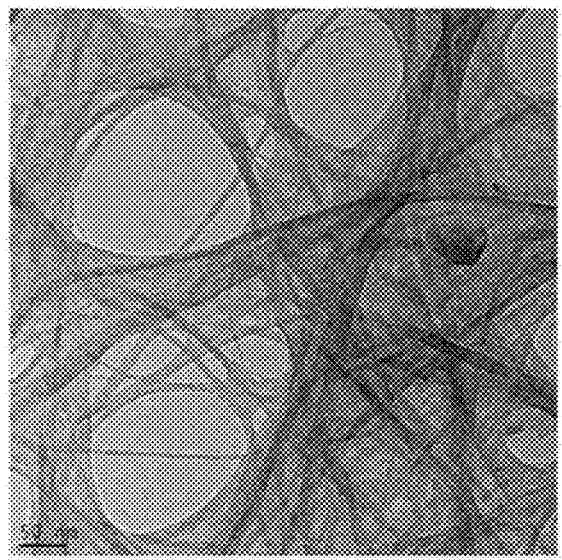
FIGS. 8A and 8B are TEM images before and after SWCNT is bonded to PAA.
Figure 8B:
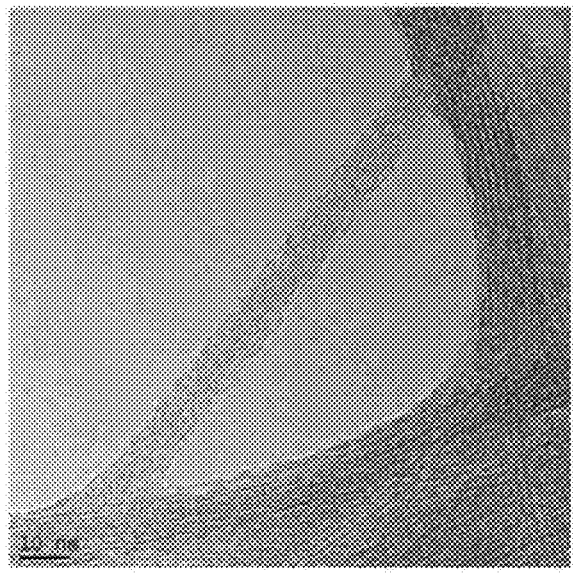
Figure 8C:
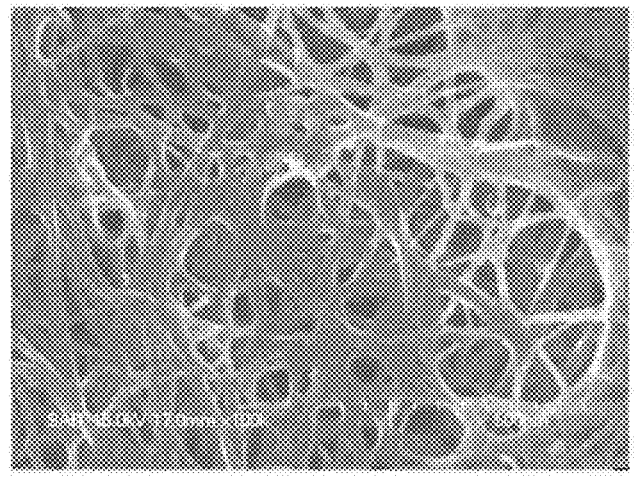
FIG. 8C is an SEM image after bonding the PAA as in Preparation Example 3.

FIGS. 8A and 8B are TEM images of before and after a single-walled carbon nanotube is bonded to a PAA. As shown in FIGS. 8A and 8B, it may be confirmed that PAA is uniformly and thoroughly bonded to SWCNT. FIG. 8C is an SEM image after bonding the PAA. As shown in FIG. 8C, it may be confirmed that the diameters of the CNT bundles dispersed are generally uniform overall.

Meanwhile, zeta potentials of the SWCNTs dispersed in negative electrolytes obtained from the Preparation Example 2 and Preparation Example 3 were measured by using a sonication method, and the results are shown in Table 1 below.

TABLE 1

|  | Zeta potential (mV) |
| --- | --- |
| Preparation Example 2 | −44.04 ± 4.51 |
| Preparation Example 3 | −48.93 ± 5.73 |

As illustrated in Table 1 above, the SWCNT is negatively charged.

Example 6

The DNA hydrogel prepared in Preparation Example 1 above was dipped in a poly(allylamine hydrochloride) (PAH) aqueous solution (concentration of 20 mM), which is a positively charged polymer, at room temperature for 30 minutes. "Poly(allylamine hydrochloride) (PAH)" having a molecular weight of 70,000(Aldrich) were used. Then, the DNA hydrogel was taken out, washed with distilled water, and freeze-dried at a temperature of −80° C. for 12 hours. Subsequently, a PAH laminated DNA hydrogel was dipped in the SDBS-SWCNT aqueous solution (concentration of 0.25 wt %) prepared in the Preparation Example 2 at room temperature for 30 minutes. Then, the DNA hydrogel was taken out, washed with distilled water, and freeze-dried at a temperature of −80° C. for 12 hours to form a layered structure having a composite layer of PAH layer/SDBS-SWCNT layer on both sides of the DNA hydrogel.

Figure 9A:
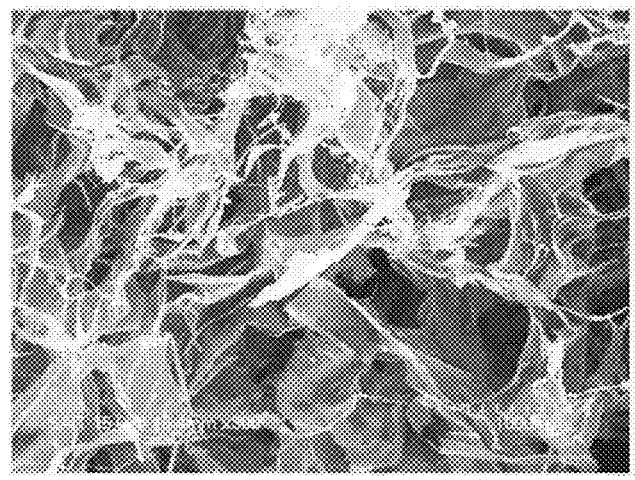
FIG. 9A is an SEM image of the laminate structure prepared in Example 6 of the present inventive concept.
Figure 9B:
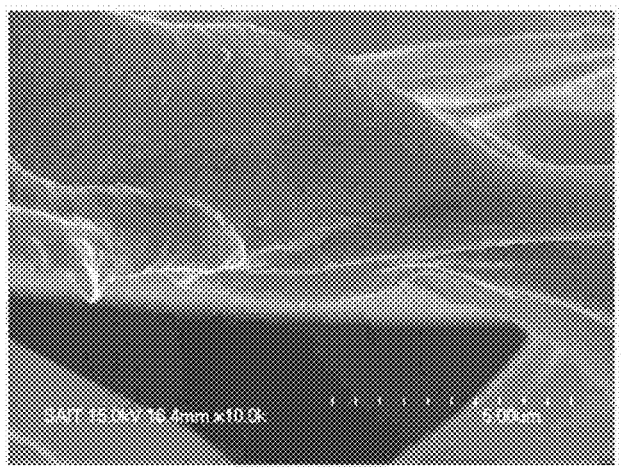
FIG. 9B is an SEM image magnified by 300 times of FIG. 9A.
Figure 9C:
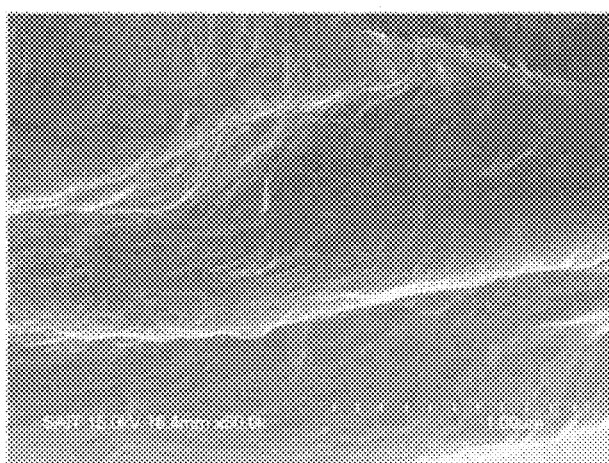
FIG. 9C is an SEM image magnified by 50,000 times of FIG. 9A.

FIG. 9A is an SEM image of the laminate structure prepared in Example 6 of the present inventive concept, FIG. 9B is an SEM image magnified by 300 times of FIG. 9A, and FIG. 9C is an SEM image magnified by 50,000 times of FIG. 9A; As shown in FIGS. 9A to 9C, it may be confirmed that a composite layer is uniformly and smoothly formed on the DNA hydrogel.

Example 7

The DNA hydrogel prepared in Preparation Example 1 was dipped in a poly(allylamine hydrochloride) (PAH) aqueous solution (concentration of 20 mM), which is a positively charged polymer, at room temperature for 30 minutes. Then, the DNA hydrogel was taken out, washed with distilled water, and freeze-dried at a temperature of −80° C. for 12 hours. Subsequently, a PAH laminated DNA hydrogel was dipped in the PAA-SWCNT aqueous solution (concentration of 1 wt %) prepared in the Preparation Example 3 at room temperature for 30 minutes. Then, the DNA hydrogel was taken out, washed with distilled water, and freeze-dried at a temperature of −80° C. for 12 hours to form a layered structure having a composite layer of PAH layer/PAA-SWCNT layer on both sides of the DNA hydrogel.

Figure 10A:
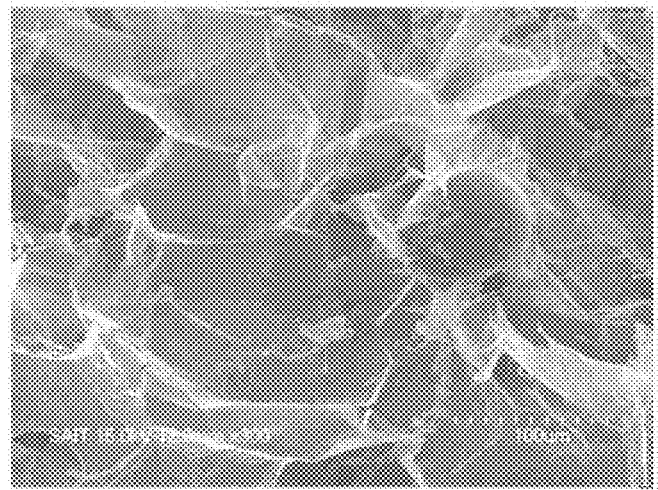
FIG. 10A is an SEM image of the laminate structure prepared in Example 7 of the present inventive concept.
Figure 10B:
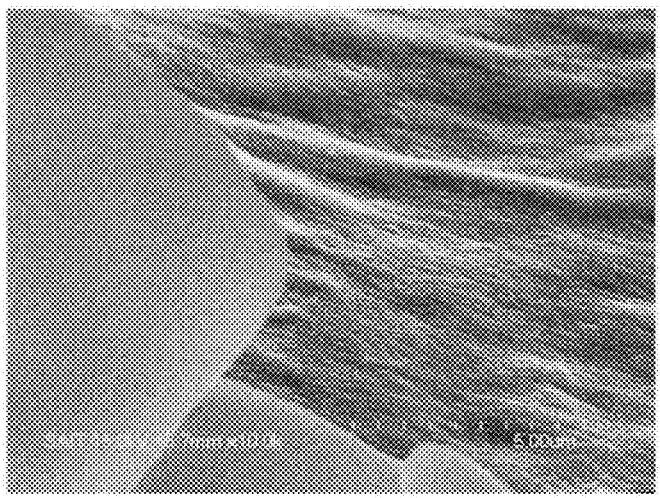
FIG. 10B is an SEM image magnified by 300 times of FIG. 10A.
Figure 10C:
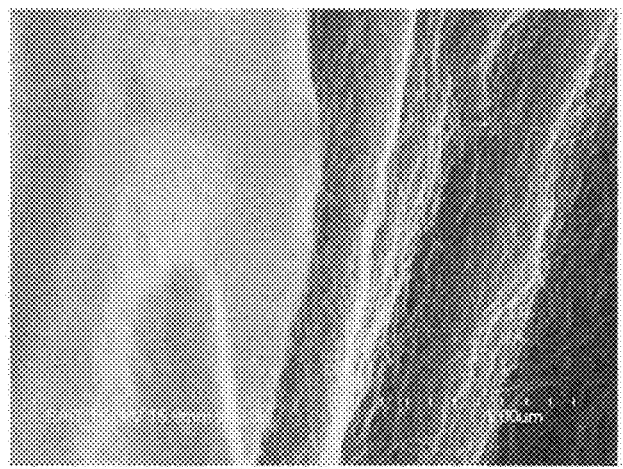
FIG. 10C is an SEM image magnified by 50,000 times of FIG. 10A.

FIG. 10A is an SEM image of the laminate structure prepared in Example 7 of the present inventive concept, FIG. 10B is an SEM image magnified by 300 times of FIG. 10A, and FIG. 10C is an SEM image magnified by 50,000 times of FIG. 10A. As shown in FIGS. 10A to 10C, it may be confirmed that a composite layer is uniformly and smoothly formed on the DNA hydrogel.

Sheet resistance of the layered structures prepared in Examples 6 and 7 were measured by using a 4-point probe method, and the results are shown in Table 2 below.

TABLE 2

|  | Sheet resistance (ohm/sq) |
| --- | --- |
| Example 6 | 20.0 ± 3.5 |
| Example 7 | 15.0 ± 3.1 |

As shown in Table 2, as a conductive composite layer including a conductive material is formed on the DNA hydrogel, sheet resistance substantially decreased.

Preparation Examples 4-1 to 4-4

Preparing PANI

Water soluble PANI (purchased from: Polysciences) was dissolved in deionized water while pH of the solution was adjusted to 1.0, 2.7, 4.0, and 6.0, in preparation examples 4-1 to 4-4 respectively, by using HCl to prepare a PANI aqueous solution.

Evaluation Example 1

Evaluation of Properties of PANI Prepared by Using a Different Method

Figure 11A:
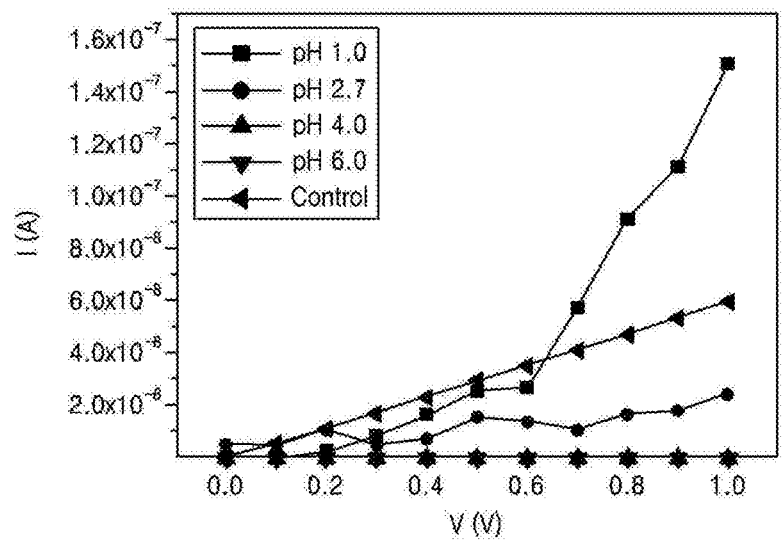
FIGS. 11A to 11C each illustrate current dependence on voltage, electrical conductivity dependence on pH, and Raman spectrum of the PANI prepared in Examples 4-1 to 4-4 along with water insoluble PANI as a control.
Figure 11B:
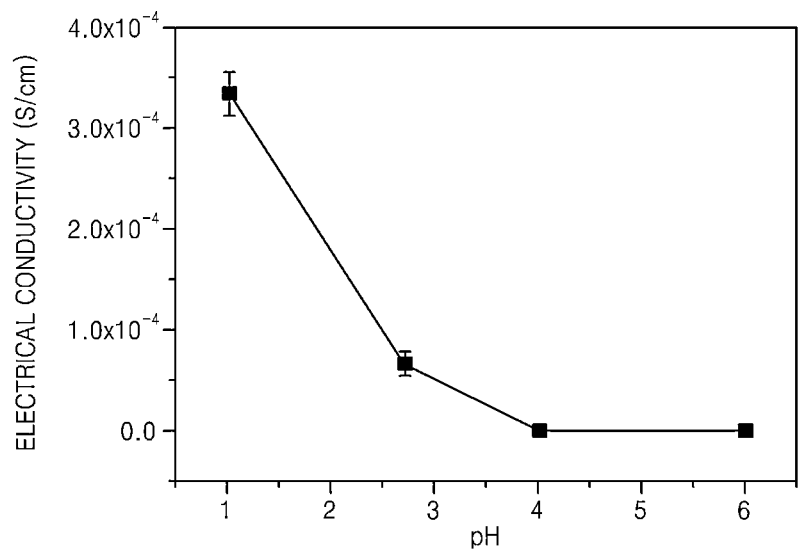
Figure 11C:
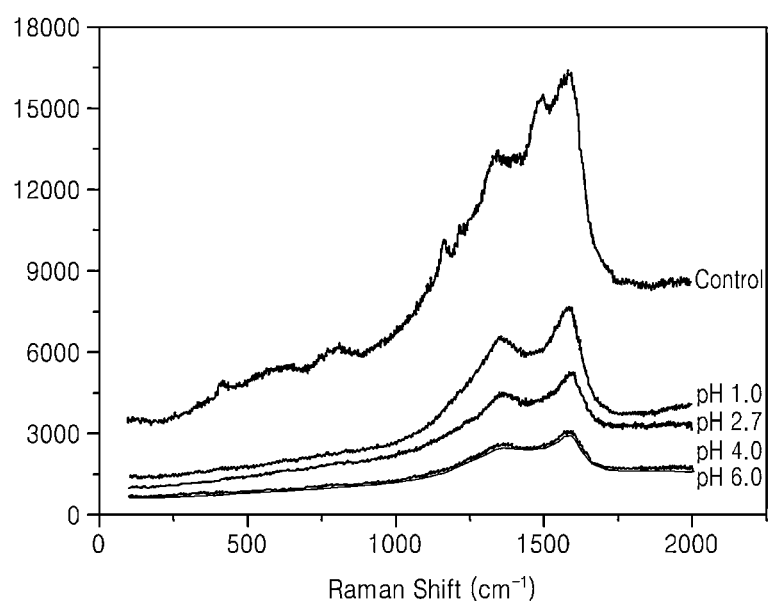

Current dependence on voltage, electrical conductivity dependence on pH, and Raman spectrum of the PANI prepared in Examples 4-1 to 4-4 are shown in FIGS. 11A to 11C along with water insoluble PANI as a control. As shown in the figures, electrical conductivity of the water soluble PANI differs depending on the pH and has better electrical conductivity than the water insoluble PANI (control). Optical properties are also different between the water soluble PANI and the water insoluble PANI.

Figure 12:
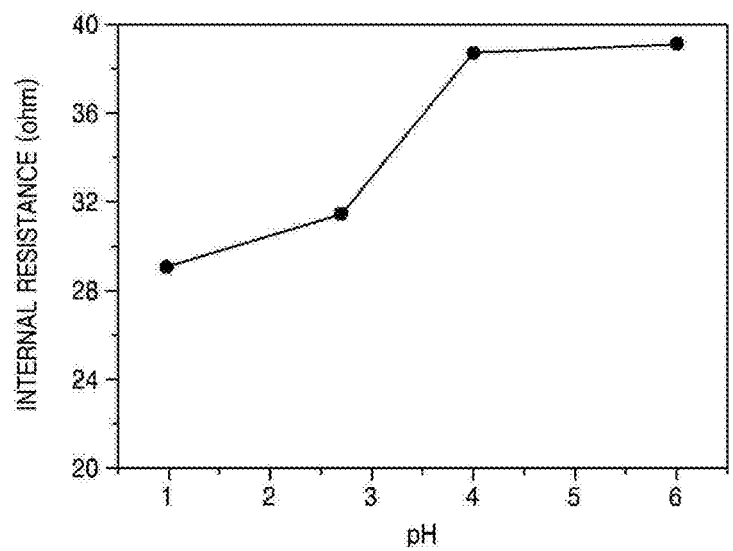
FIG. 12 is a graph showing electrochemical resistance of a solution including a PANI prepared in Preparation Examples 4-1 to 4-4.
Figure 13A:
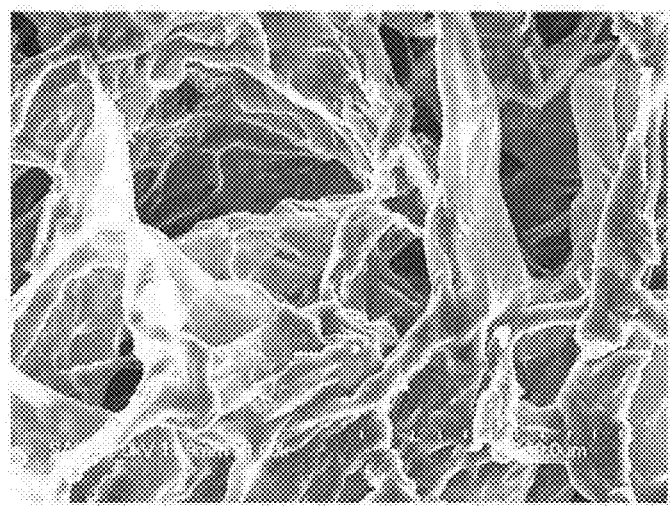
FIGS. 13A to 13D are each SEM images of the laminate structures manufactured in Examples 8-1 to 8-4 respectively.
Figure 13B:
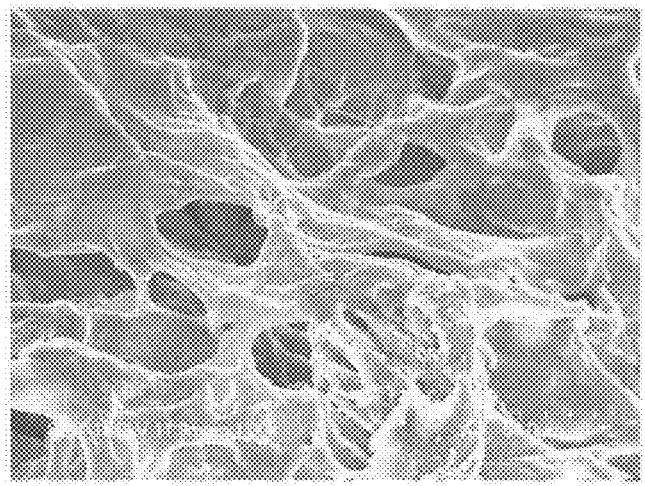
Figure 13C:
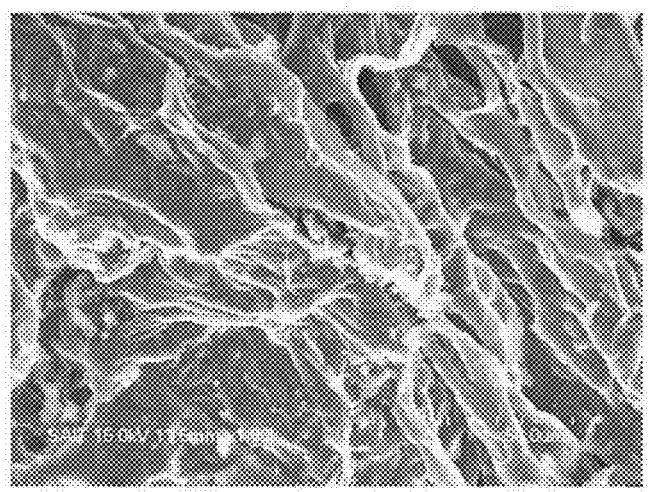
Figure 13D:
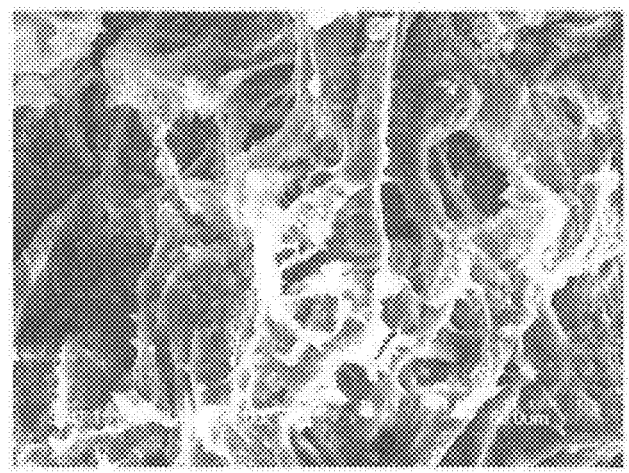

Also, electrochemical resistance of a wet PANI prepared in Preparation Examples 4-1 to 4-4 was measured by using a galvanostatic method. As shown in FIG. 12, internal resistance was low for the PANI prepared at low pH, hence, PANI prepared in an acidic condition has a low internal resistance (IR). Internal resistance was measured from a value of IR voltage drop at a constant voltage measurement (R=ΔIR/I).

Examples 8-1 to 8-4

The layered structure including the composite layer of PAH layer/PAA-SWCNT layer on both sides of the DNA hydrogel prepared in Example 7 was dipped in a PANI aqueous solution including the PANI obtained from Example 4-1 in concentrations of 5 mg/ml, 10 mg/ml, 20 mg/ml, and 40 mg/ml, in examples 8-1 to 8-4 respectively, for 30 minutes at room temperature. Thereafter the DNA hydrogel was taken out and washed with distilled water, and freeze-dried at a temperature of −80° C. for 12 hours to prepare a composite layer of PAH layer/PAA-SWCNT layer/PANI layer on the DNA hydrogel.

FIGS. 13A to 13D are each SEM images of the layered structure manufactured in Examples 8-1 to 8-4 respectively. As illustrated in the drawings, when PANI is present, a surface structure of the DNA hydrogel changes due to the coating of the PANI layer compared to Example 7 without the PANI; and thus, it may be inferred that the greater the concentration of the PANI, the greater the amount of the coated PANI.

Evaluation Example 2

Cyclic Voltammetry Test

An electrode was manufactured using the conductive layered structure of Example 1, Example 7, and Examples 8-1 to 8-4. Changes in current with respect to changes in voltage in the electrode were measured using cyclic voltammetry. The results are shown in FIGS. 14A and 14B.

The conductive layered structure of Example 1, Example 7, and Examples 8-1 to 8-4 as a working electrode, a platinum mesh plate as a counter electrode, and a carbon plate as a current collector, and a Whatman paper as a separator, and a 1.0M sulfuric acid solution ($H_2SO_4$) as an electrolyte were used. The cyclic voltammetry test was performed with an AUTOLAB PGSTAT 100 potentiostat.

Figure 14A:
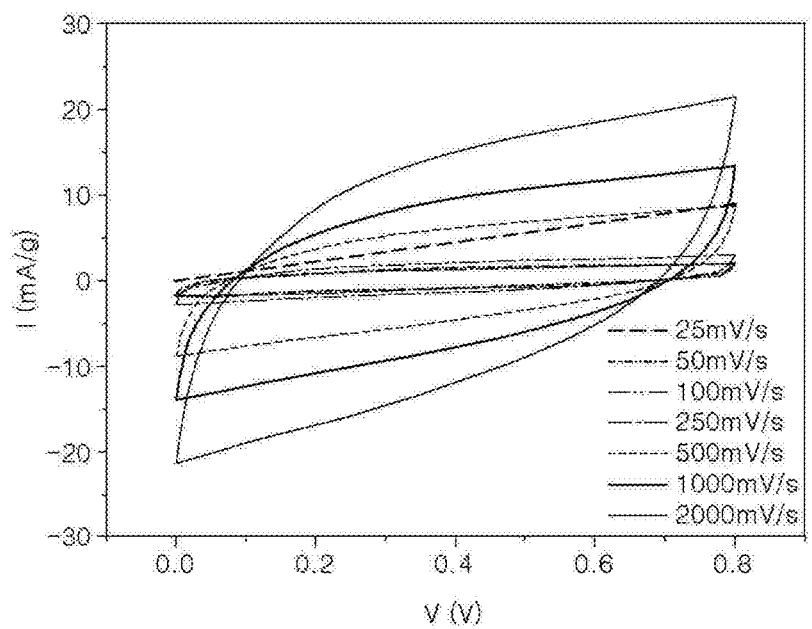
FIG. 14A is a graph showing results of a cyclic voltammetry test of an electrode including the conductive layered structure manufactured in Example 1 of the present inventive concept and FIG. 14B is a graph showing results of a cyclic voltammetry test of an electrode including the conductive layered structure manufactured in Example 8-1.

As shown in FIG. 14A, even with increasing scan rates, curves maintained symmetry, showing an ideal capacitor behavior.

Figure 14B:
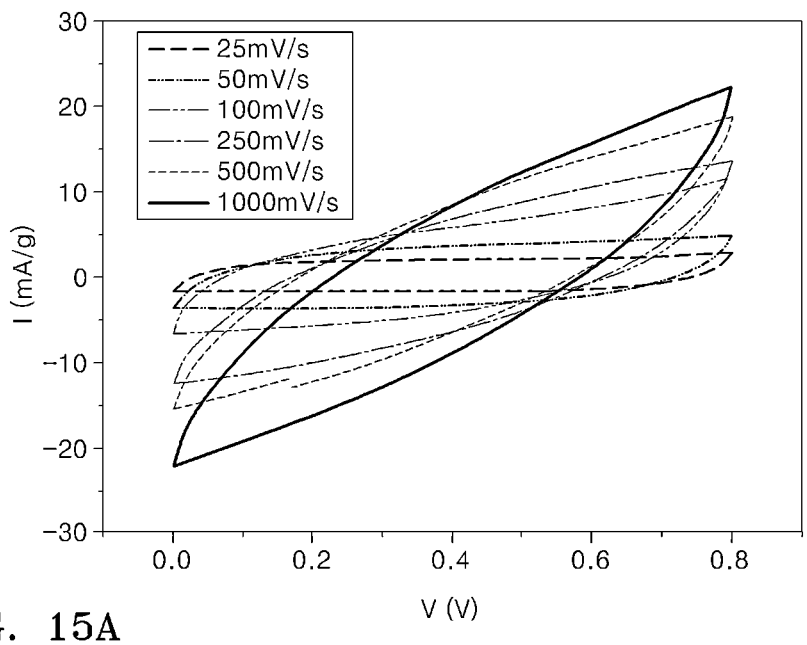

FIG. 14B shows a cyclic voltammetry curve by varying concentrations of PANI at a scan rate of 25 mV/s and it may be inferred that specific capacitance increases when the PANI is present than when the PANI is absent and that the specific capacitance increases and then decreases as the concentration of the PANI increases.

Evaluation Example 3

Galvanostatic Charge/Discharge Test

With the conductive layered structure of Example 1 as a working electrode, a platinum mesh plate as a counter electrode, and a 1.0M sulfuric acid solution as an electrolyte, a galvanostatic charge/discharge test was performed with an AUTOLAB PGSTAT 100 potentiostat at a current density of about 1 A/g. The results of the galvanostatic charge/discharge test on the conductive layered structure of Example 1 are shown in FIG. 15A.

The conductive layered structures of Example 1 and Example 8-1 dipped in phosphate buffered saline (PBS) and an artificial urine (AU), respectively as working electrodes, and the galvanostatic charge/discharge test was performed by using an AUTOLAB PGSTAT 100 potentiostat at a current density of about 1 A/g to about 20 A/g.

Figure 15A:
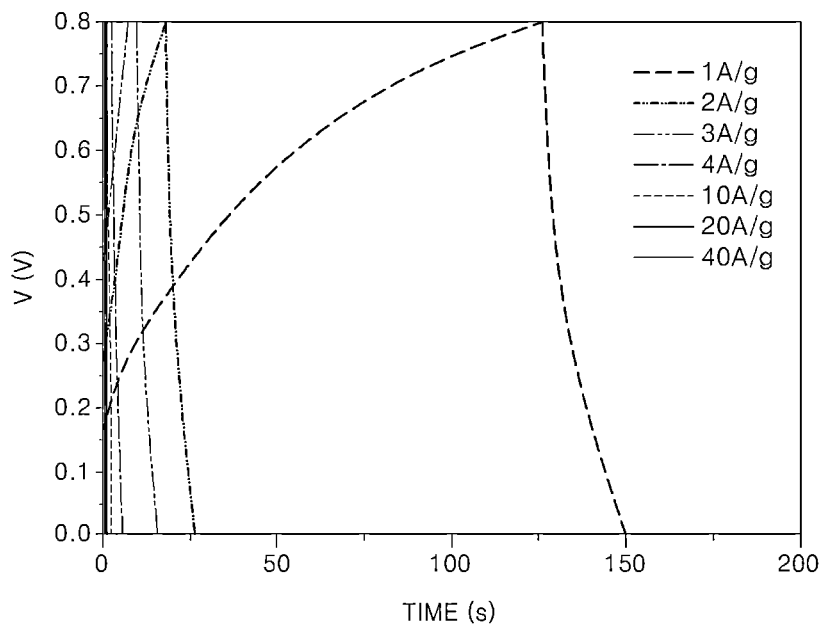
FIGS. 15A and 15B are graphs showing changes in voltage according to time of electrodes including the conductive layered structure prepared in Example 1 and Example 8-1, respectively.
Figure 15B:
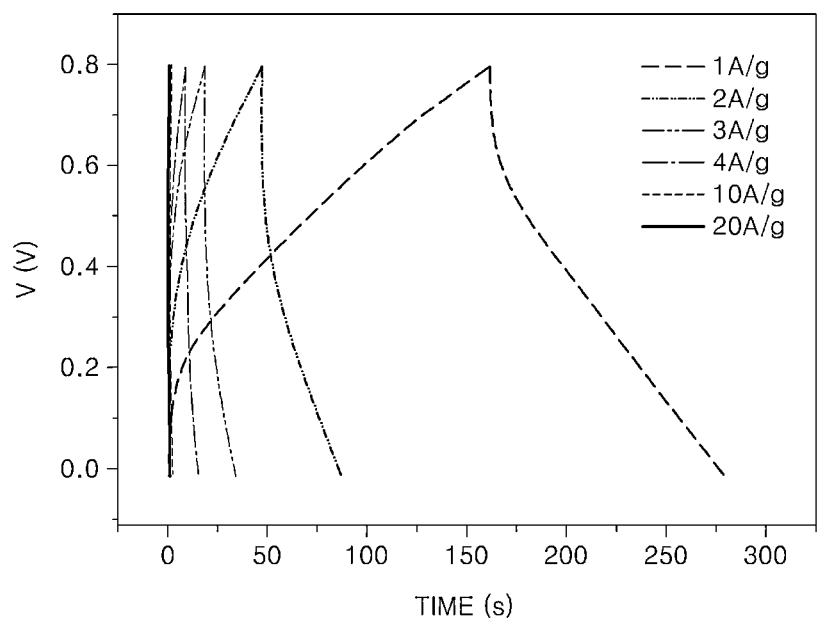

FIGS. 15A and 15B are graphs showing changes in voltage according to time of electrodes including the conductive layered structure each prepared in Example 1 and Example 8-1.

Figure 16:
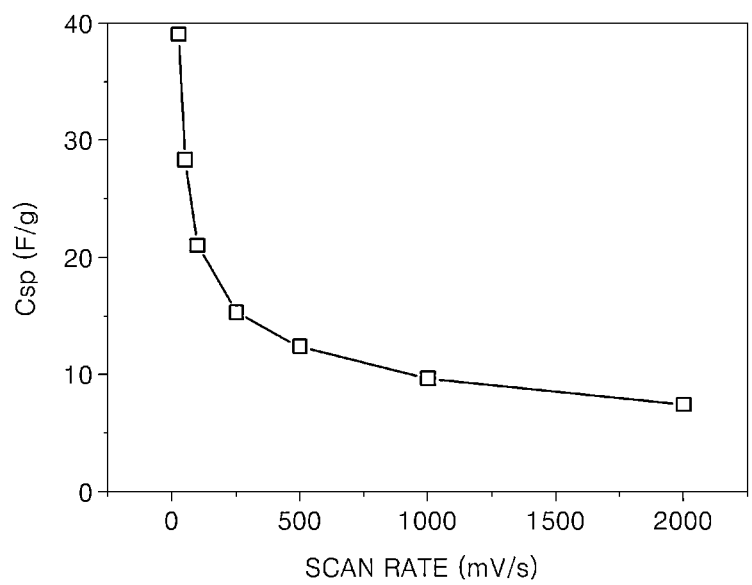
FIG. 16 is a graph showing specific capacitance according to scan rate of an electrode including the conductive layered structure manufactured in Example 1.
Figure 17A:
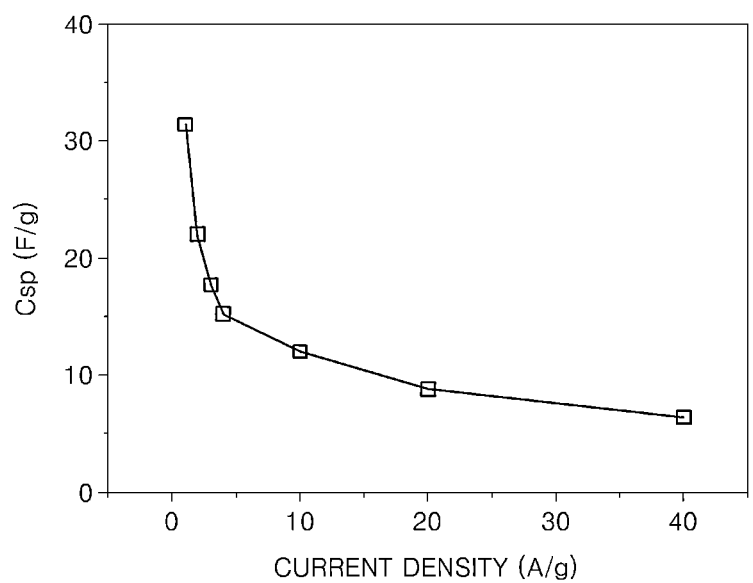
FIGS. 17A and 17B are graphs showing specific capacitance according to current density of an electrode including the conductive layered structure manufactured in Example 1 and Example 8-1, respectively.
Figure 17B:
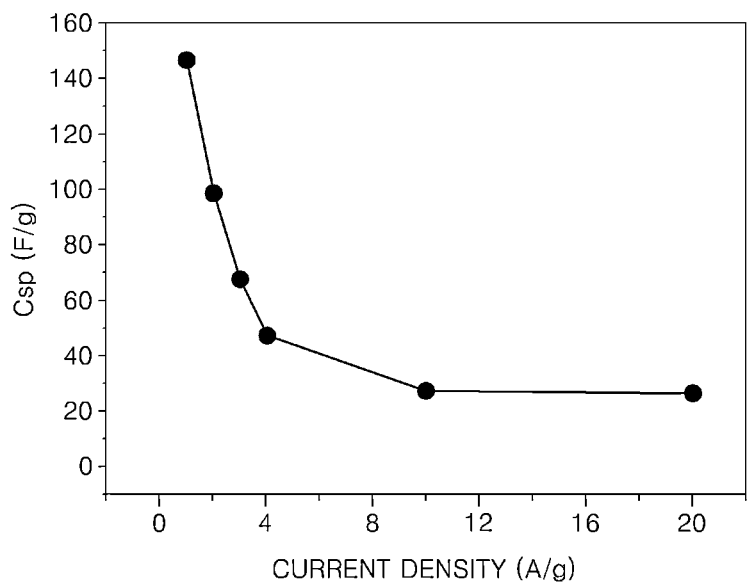

FIG. 16 is a graph showing specific capacitance according to scan rate of an electrode including the conductive layered structure each manufactured according to Example 1. FIGS. 17A and 17B are graphs showing specific capacitance according to current density of an electrode including the laminate structure manufactured in Example 1 and Example 8-1 respectively. As shown in FIGS. 16 and 17A, with increasing scan rate and current density, the specific capacitance decreased from about 40 F/g to about 5 F/g. This is a general tendency of supercapacitors and such a reduction in specific capacitance may be attributed to the fact that ions separated from the electrolyte fail to reach an equilibrium at a high scan rate and a high current density to form an electrical double layer (EDL) on the porous polymer electrolyte-DNA hydrogel electrode. Also, as shown in FIG. 17B, the specific capacitance decreases according to an increase in the scan rate and the current density and converges at a certain value.

Figure 18A:
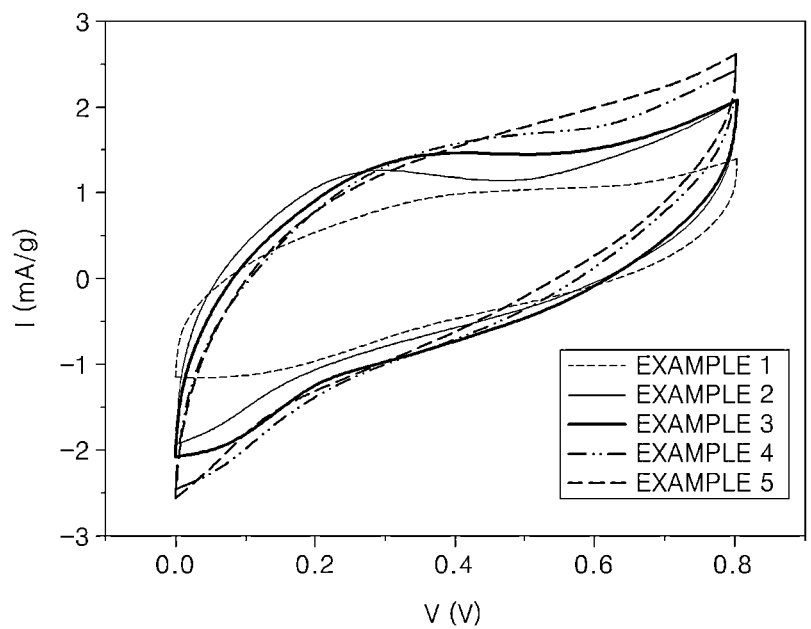
FIGS. 18A and 18B are graphs showing cyclic voltammetry at a scan rate of 25 mV/s of the electrodes each manufactured in Examples 1 to 5 and Example 8-1 of the present inventive concept.
Figure 18B:
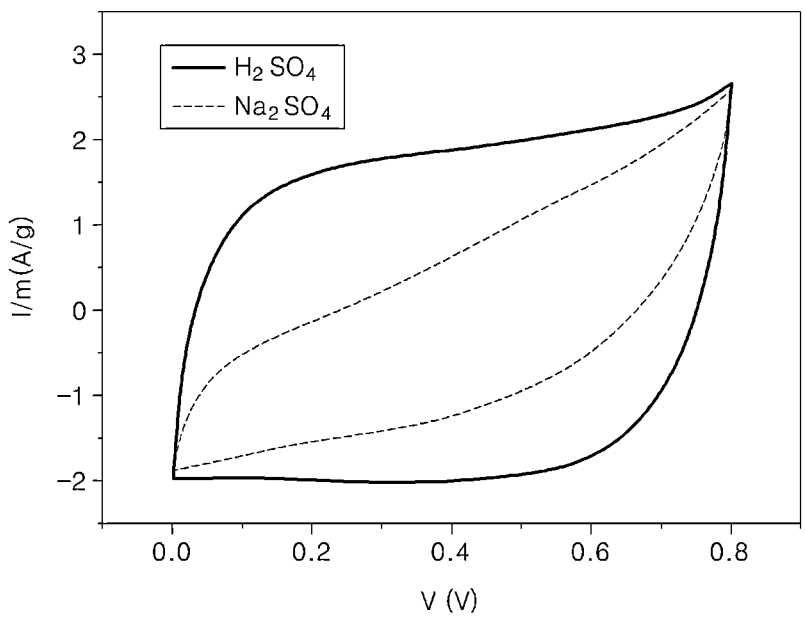
Figure 19A:
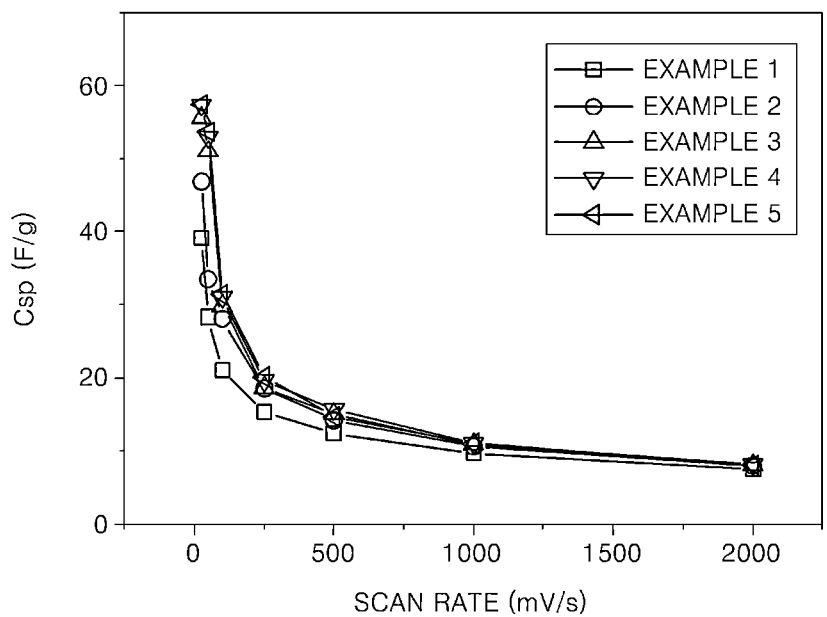
FIGS. 19A and 19B are graphs showing specific capacitance according to a scan rate and specific capacitance at a scan rate of 25 mV/s of the electrodes each manufactured in Example 1 to Example 5.
Figure 19B:
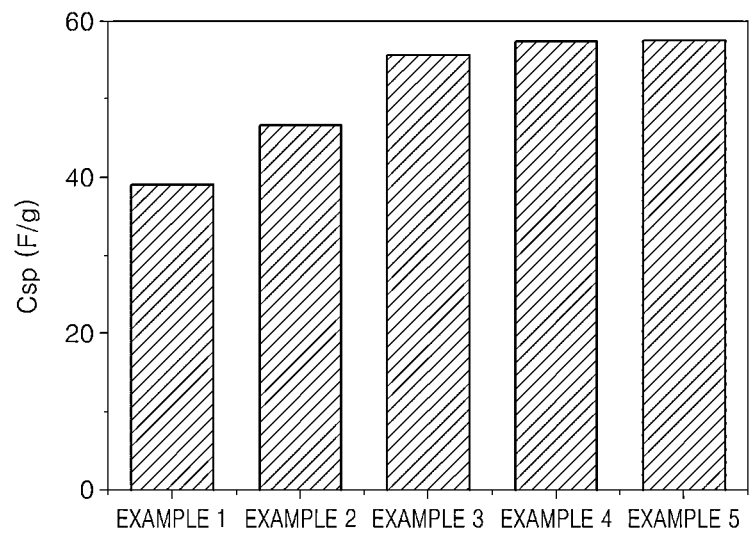

FIGS. 18A and 18B are graphs showing cyclic voltammetry of the electrodes prepared in Examples 1 to 5 (FIG. 18A), and Example 8-1 (FIG. 18B) at a scan rate of 25 mV/s. FIG. 19A is a graph showing specific capacitance according to the scan rate of the electrodes prepared in Examples 1 to 5. FIG. 19B is a graph showing the specific capacitance of the electrodes prepared in Examples 1 to 5 at a scan rate of 25 mV/s.

As shown in FIG. 18A, the specific capacitance increases linearly according to the number of laminated conductive polymer electrolyte layers. However, the specific capacitance does not increase beyond a certain value, and this is probably because an increase in capacitance due to an increase in surface area and a decrease in capacitance due to an increase in weight offset each other.

As shown in FIG. 18B, when a PANI coated electrode is used, a specific capacitance in an acidic electrolyte ($H_2SO_4$) was increased more than in a neutral electrolyte ($Na_2SO_4$), because the electrical conductivity of the PANI depends on the pH of the solution.

As shown in FIG. 19A, it may be observed that the specific capacitance decreases as the scan rate increases in the case of an electrode in which a plurality of conductive polymers are laminated because the specific capacitance depends on a potential scan rate.

As shown in FIG. 19B, with an increasing number of composite layers, the specific capacitance (Csp) was increased at the same scan rate. With three or greater number of composite layers, the specific capacitance (Csp) was not increased any longer. The specific capacitance (Csp) was increased up to about 57.7F/g at a scan rate of about 25 mV/s.

Figure 20A:
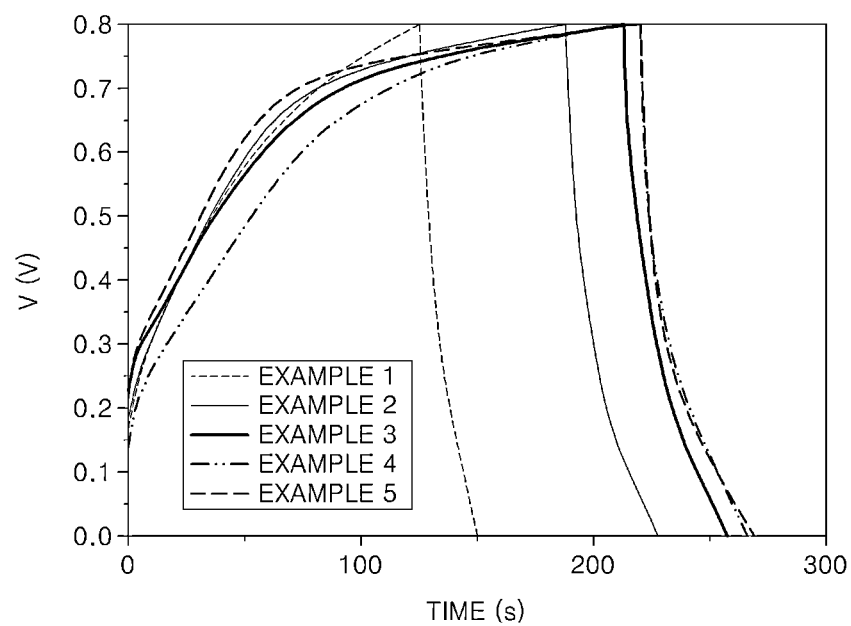
FIGS. 20A, 20B, and 20C are graphs respectively illustrating a charge-discharge curve, specific capacitance according to current density, and specific capacitance at current density of 1 A/g of the electrodes manufactured in Example 1 to Example 5.
Figure 20B:
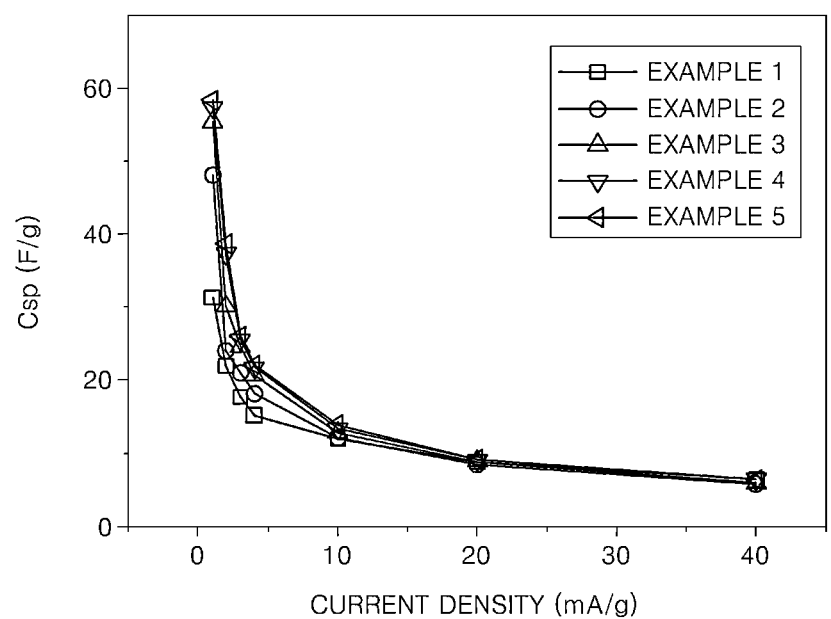
Figure 20C:
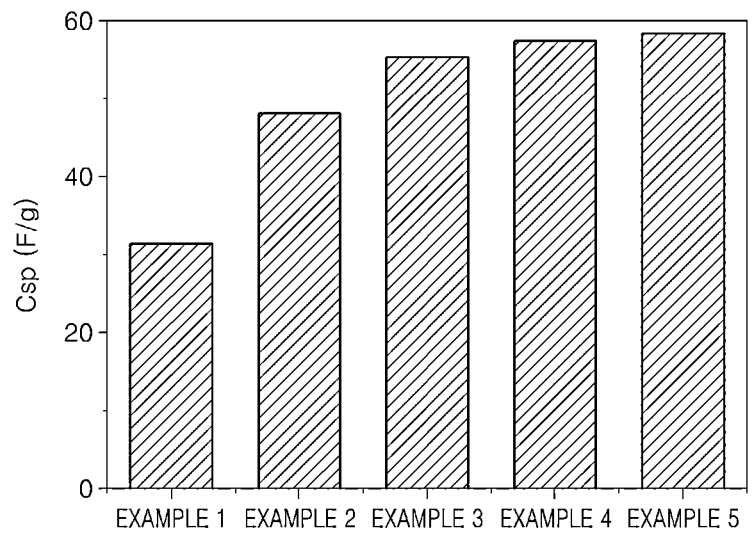

FIG. 20A is a graph of cyclic voltammetry with respect to time of the electrodes prepared in Examples 1 to 5 at a current density of about 1 A/g. FIG. 20B is a graph of specific capacitance with respect to a change in current density of the electrodes prepared in Examples 1 to 5, and FIG. 20C is a graph of specific capacitances of the electrodes prepared in Examples 1 to 5 at a current density of about 1 A/g.

As shown in FIG. 20, the specific capacitance (Csp) did not increase any more with three or more layers, and the specific capacitance increased to about 58.3 F/g at a current density of 1 A/g. This is attributed to the fact that, conductivity increases with the increasing number of composite layers due to a larger number of PEDOT layers.

Figure 21:
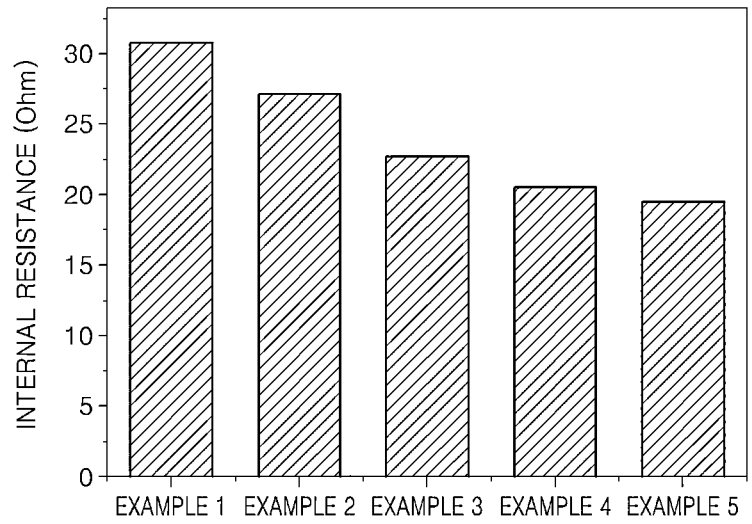
FIG. 21 is a graph showing internal resistance of the electrodes manufactured in Example 1 to Example 5.
Figure 22A:
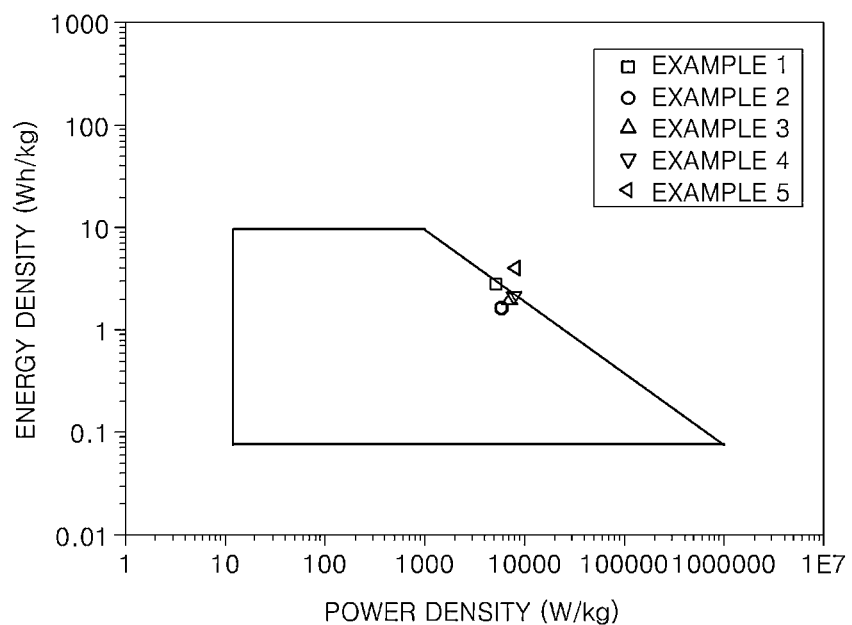
FIGS. 22A and 22B are graphs showing Ragone plots of the electrodes including the conductive layered structures each manufactured in Examples 1 to 5, and Example 8-1, respectively.
Figure 22B:
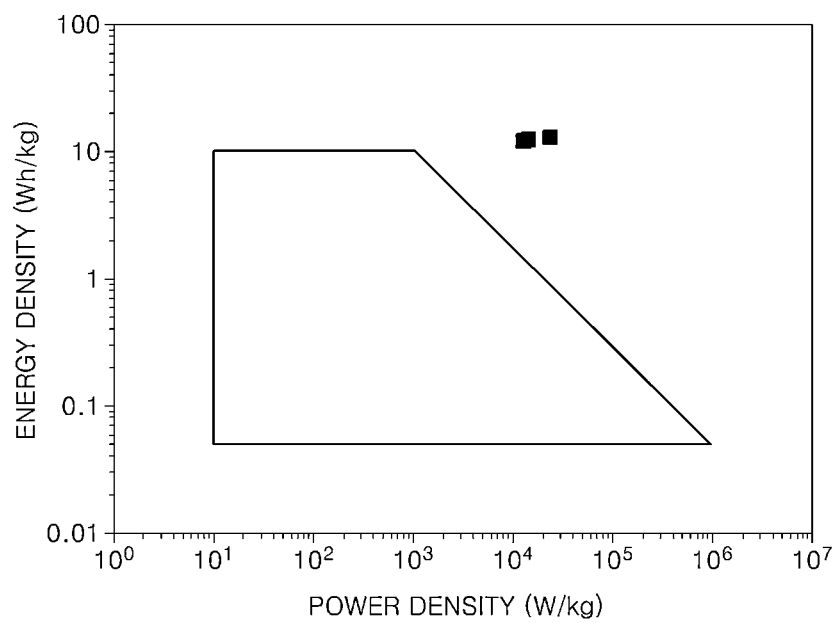
Figure 23A:
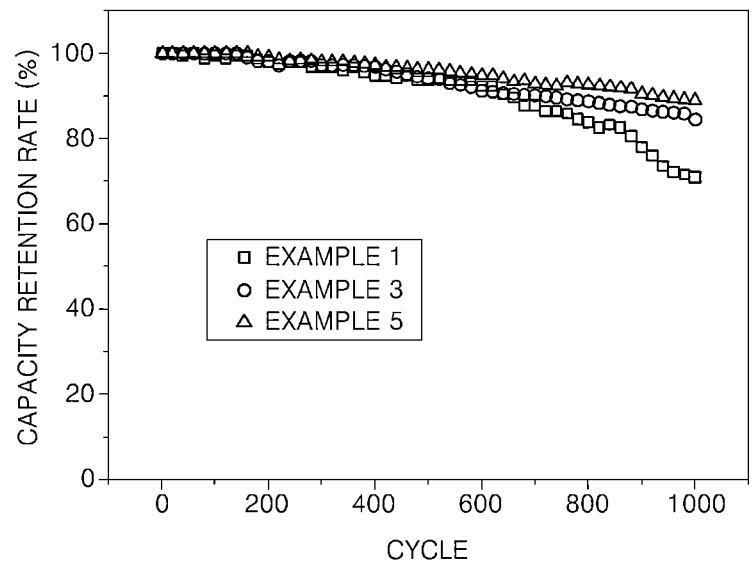
FIGS. 23A and 23B are graphs showing cycle stability of an electrode including the conductive layered structure manufactured in Examples 1, 3, 5, and Example 8-1, respectively.
Figure 23B:
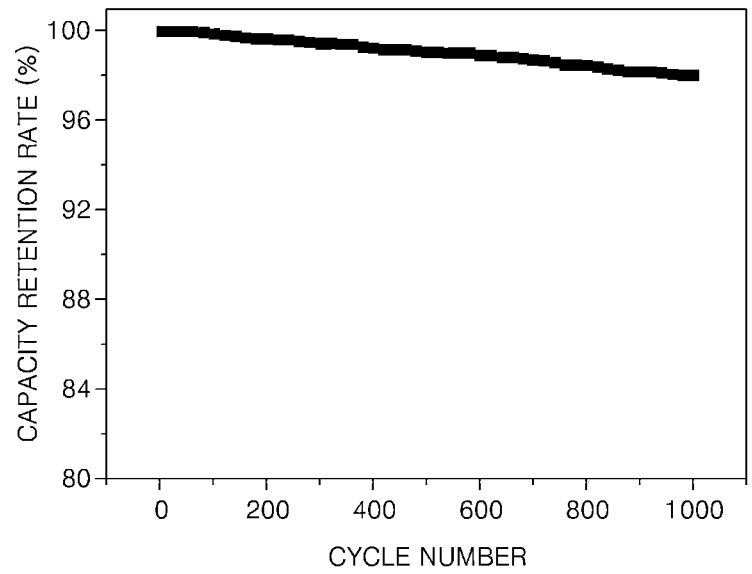

FIG. 21 is a graph showing internal resistances of the electrodes of Examples 1 to 5. FIGS. 22A and 22B are a Ragone plot of the electrodes prepared in Examples 1 to 5, and Example 8-1. FIGS. 23A and 23B are graphs showing cyclic stability of the electrodes prepared in Examples 1, 3, 5, and Example 8-1 at a current density of about 2 A/g.

As shown in FIG. 21, the electrochemical internal resistance was lower in the electrode of Preparation Example 5 including five composite layers, by about 37% than in the electrode including one composite layer. No significant increase in specific capacitance (Csp) was observed in the structures with 3 or more layers, which is attributed to the fact that the increase in specific capacitance (Csp) due to a reduced internal resistance was off-set by a decrease in specific capacitance (Csp) due to the increased mass of the electrode active material. As shown in the Ragone plot of FIG. 22A, the power density and current density increased with the increasing number of composite layers, which indicates similar or slightly better performance as compared to commercial supercapacitors (a box delimited by solid lines). As shown in FIG. 22B, it may be inferred that in the case of an electrode in which CNT and PANI are laminated on a DNA hydrogel, the performance is much better than the commercial supercapacitors.

Also, as shown in FIGS. 23A and 23B, a cycling test was conducted to determine charge/discharge stability. As a result, the specific capacitance (Csp) was maintained nearly constant without a reduction up to about 200 times of the cycling. That is, the specific capacitance may maintain a similar capacitance value to the initial level even after multiple times of charge/discharge cycles. However, after about 200 times or more of the cycle, gradual performance degradation occurred. After about 1000 times of the cycle, the specific capacitance (Csp) reached about 82% to 84% of the initial Csp in the structures with three to five composite layers, and remained at about 65% of the initial Csp in the structure with one composite layer. These reductions in specific capacitance are attributed to morphological changes (mechanical damage) in the stacked structures caused from desorption of the conductive PEDOT and adsorption and desorption of the electrolyte ions during the charging/discharging. In the layered structures with three to five composite layers, a polymer electrolyte encapsulation effect in the PEDOT layer may be stronger than in the one-layered stacked structure, and thus the porous electrode may become more resistant to deformation caused by charging/discharging.

The electrode of Example 1 including the conductive layer structure had a high specific capacitance of about 50 F/g or higher, a power density of about 5,000 W/kg or higher, and an energy density of about 1 Wh/kg or higher.

Example 9

Manufacture of Supercapacitor

Figure 24:
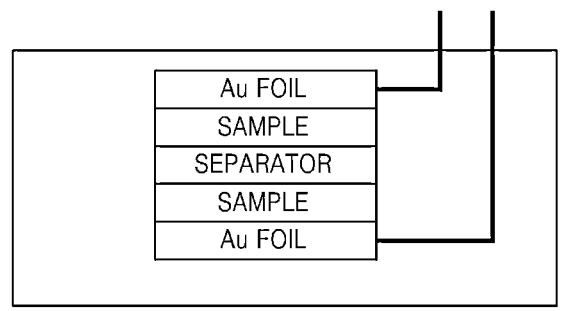
FIG. 24 is a schematic view illustrating a bioimplantation process of supercapacitor according to an embodiment of the present inventive concept.

The stacked structures of Example 5 were coated on two gold foils as current collectors, respectively, using drop casting and freeze-drying, followed by inserting a cellulose paper as a separator between the two opposite stacked structures with the metal foils thereon, and sealing with a polybag, thereby manufacturing an implantable supercapacitor as an embodiment illustrated in FIG. 24.

Figure 25A:
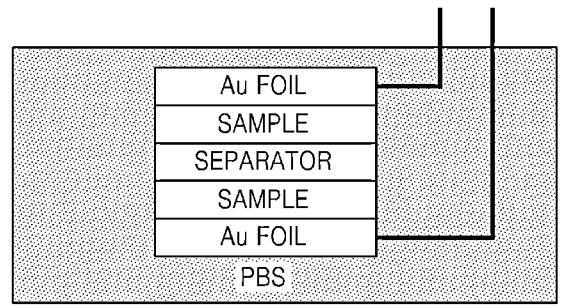
FIG. 25A to 25C are schematic views illustrating a method of evaluating performance of a supercapacitor including the conductive layered structure prepared in Example 1 of the present inventive concept in a physiological environment.
Figure 25B:
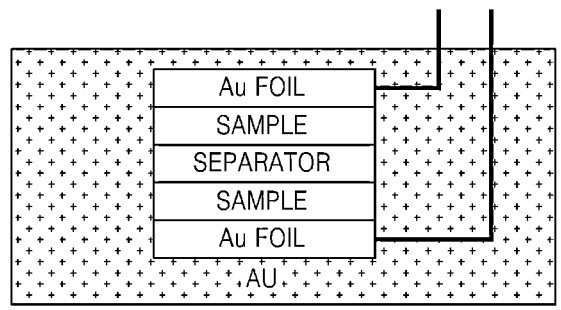
Figure 25C:
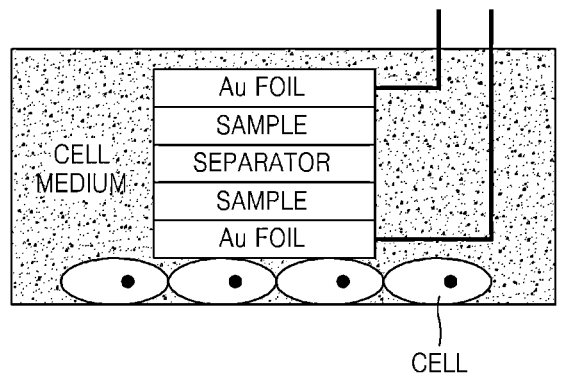

Performance of the implantable supercapacitor was measured in physiological environments. To this end, the implantable supercapacitor was dipped in phosphate buffered saline (PBS), artificial urine (AU), and a cell medium, as illustrated in FIG. 25 to measure performance. In FIG. 25, "SAMPLE" indicates the layered structure of Example 5 as an electrode active material including, i.e., the DNA hydrogel and the composite layer of polymer electrolyte and conductive material. The PBS had a pH 7.4 (available from Gibco). The artificial urine (AU) contained 1.1 mM lactic acid, 2.0 mM citric acid, 2.5 mM sodium carbonate, 2.5 mM calcium chloride, 90 mM sodium chloride, 2.0 mM magnesium sulfate, 10 mM sodium sulfate, 7.0 mM potassium dihydrogen phosphate, 7.0 mM dipotassium hydrogen phosphate, 25 mM ammonium chloride, and 170 mM urea. The cell culture included Minimum Essential Medium with Earle's Balanced Salts (MEM/EBSS, including NIH3T3 cells and monkey skin cells), Dulbecco's modified eagle medium (DMEM, including HDF cells, human skin cells), 10% of fetal bovine serum, and 1% of peniciline.

Figure 26A:
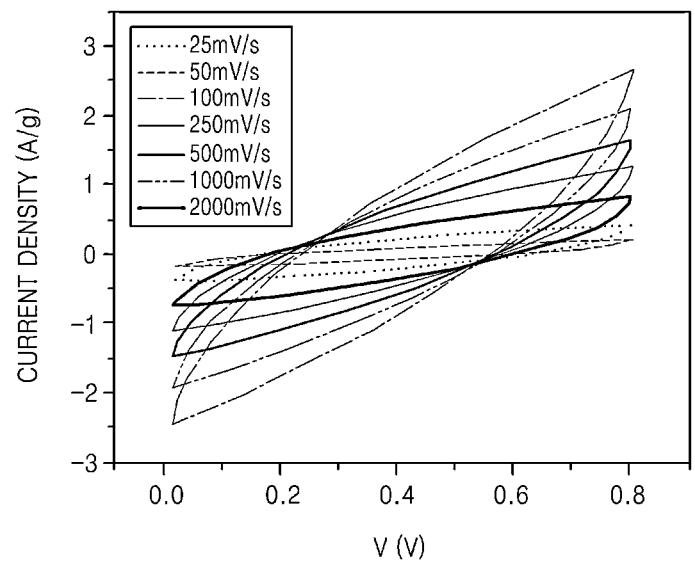
FIGS. 26A and 26B respectively show cyclic voltammetry curves of the supercapacitor manufactured in Example 1 of the present inventive concept in phosphate buffered saline (PBS) and artificial urine (AU)
Figure 26B:
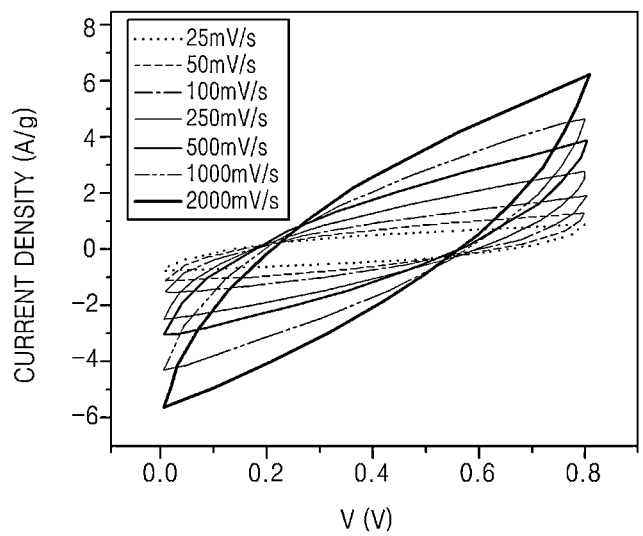
Figure 26C:
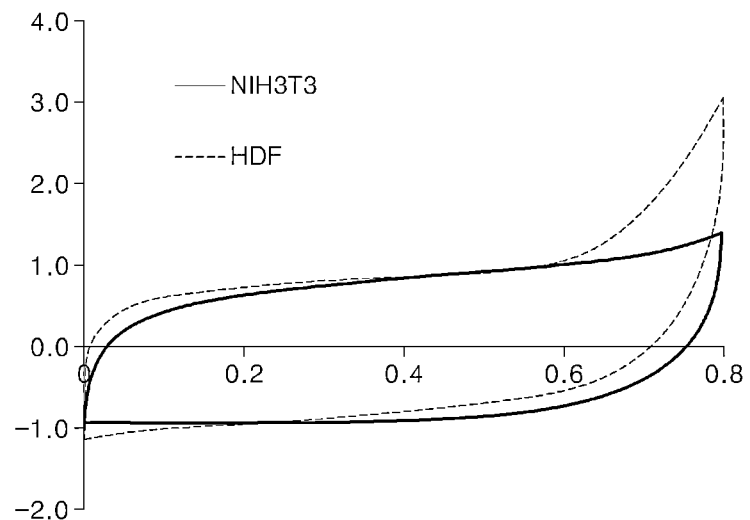
FIG. 26C is a cyclic voltammetry curve of the supercapacitor manufactured in Example 8-1 of the present inventive concept in murine skin cells and human skin cells.
Figure 27A:
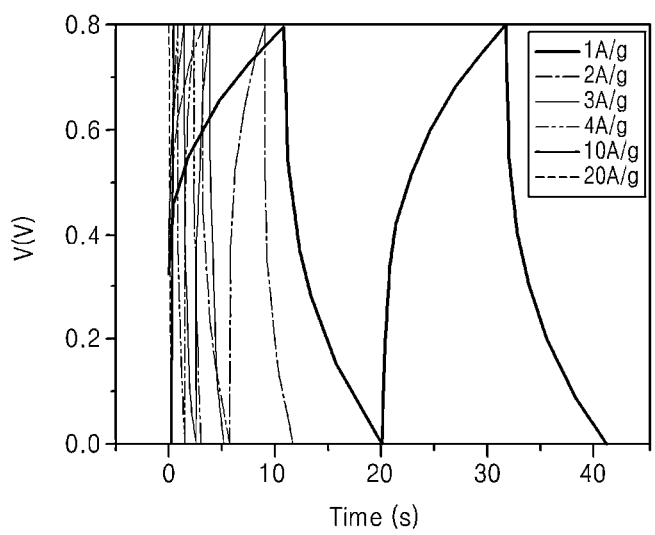
FIGS. 27A and 27B are charge and discharge curves of supercapacitors including the conductive layered structure manufactured in Example 1, in PBS and AU, respectively.
Figure 27B:
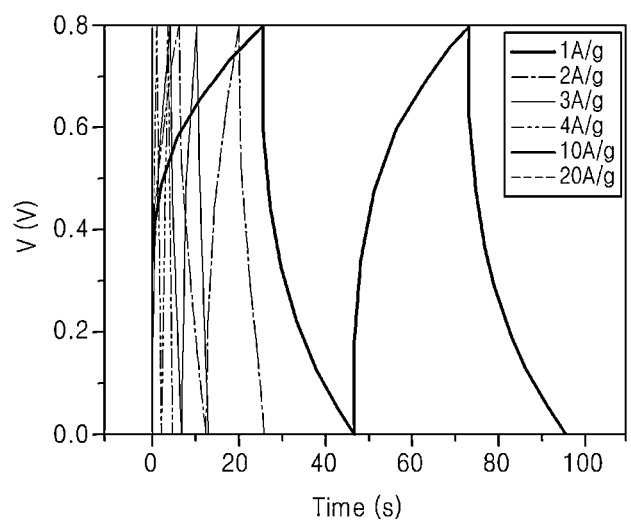
Figure 27C:
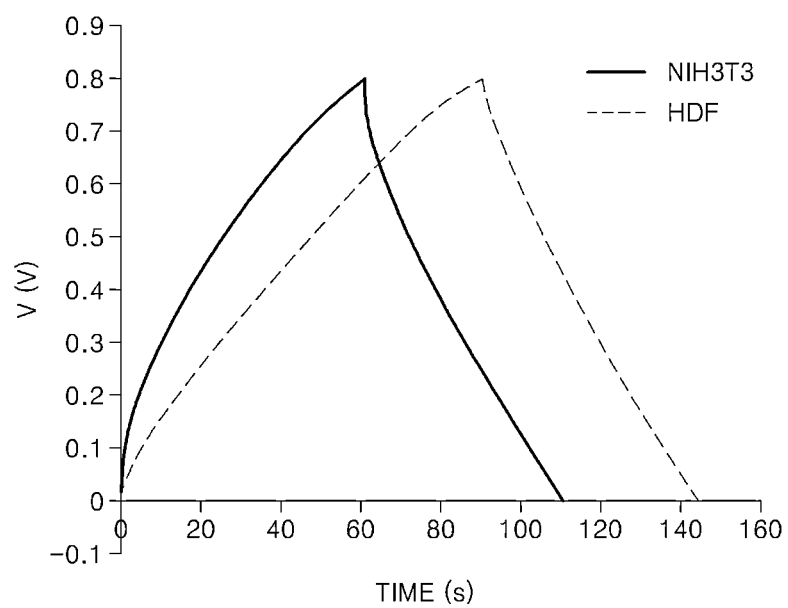
FIG. 27C is a charge-discharge curve of a supercapacitor including the conductive layered structure manufactured in Example 8-1 of the present inventive concept in murine skin cells and human skin cells.

FIGS. 26A and 26B show results of a galvanostatic charge/discharge test in the PBS and AU, respectively (at different potential scan rates from about 25 mV/s to about 2000 mV/s). FIG. 26C shows a cyclic voltammetry curve when NIH3T3 and HDF cell culture media are used as an electrolyte. As shown in FIGS. 26A and 26B, the curve remained symmetrical even with an increased scan rate, showing an ideal capacitor behavior. Also, as shown in FIG. 26C, it may be inferred that the same effects were shown in a cell medium. FIGS. 27A and 27B are the results of a galvanostatic charge/discharge test using the supercapacitor in PBS and AU, respectively, measured according to the above-described method. As shown in FIGS. 27A and 27B, the supercapacitors operated smoothly in both PBS and AU. FIG. 27C shows results of a galvanostatic charge/discharge test using NIH3T3 and HDF cell culture media as an electrolyte. As shown in FIG. 27C, the supercapacitor operated smoothly in both of the different cell culture media.

Figure 28A:
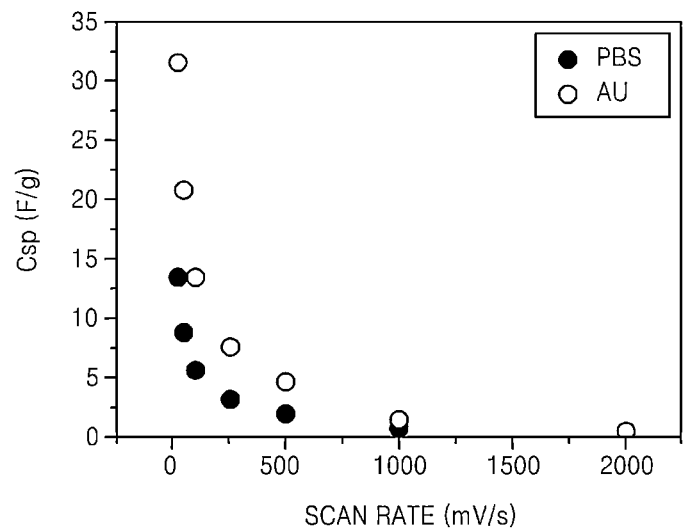
FIGS. 28A and 28B are graphs showing specific capacitance according to potential scan rate and current density in each of PBS and AU of a supercapacitor including the conductive layered structure manufactured in Example 1 of the present inventive concept.
Figure 28B:
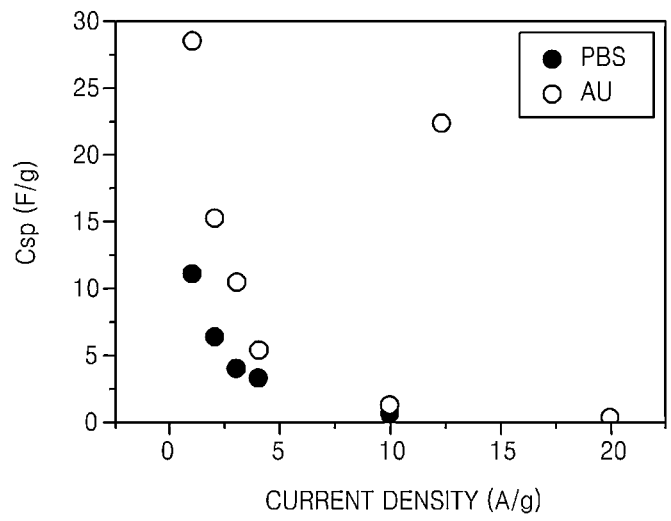
Figure 28C:
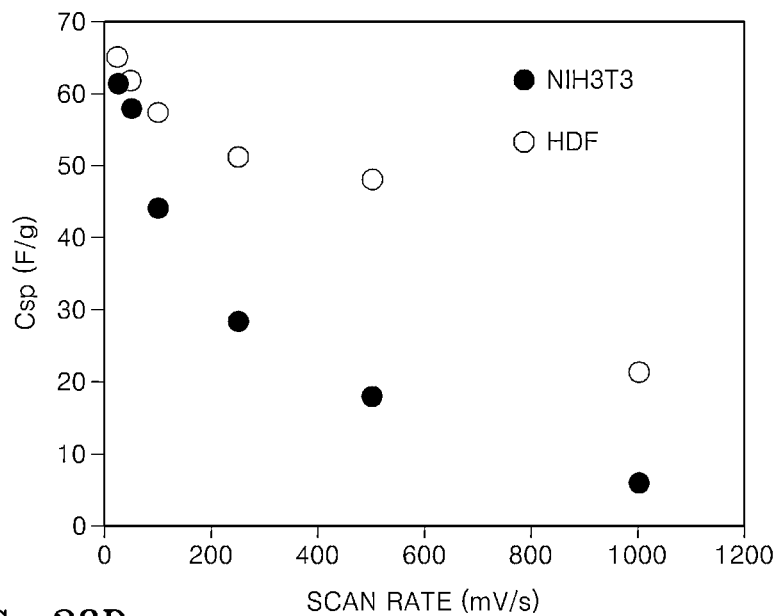
FIGS. 28C and 28D are graphs showing specific capacitance according to potential scan rate and current density of a supercapacitor including the conductive layered structure manufactured in Example 8-1 of the present inventive concept in each of murine skin cells and human skin cells.
Figure 28D:
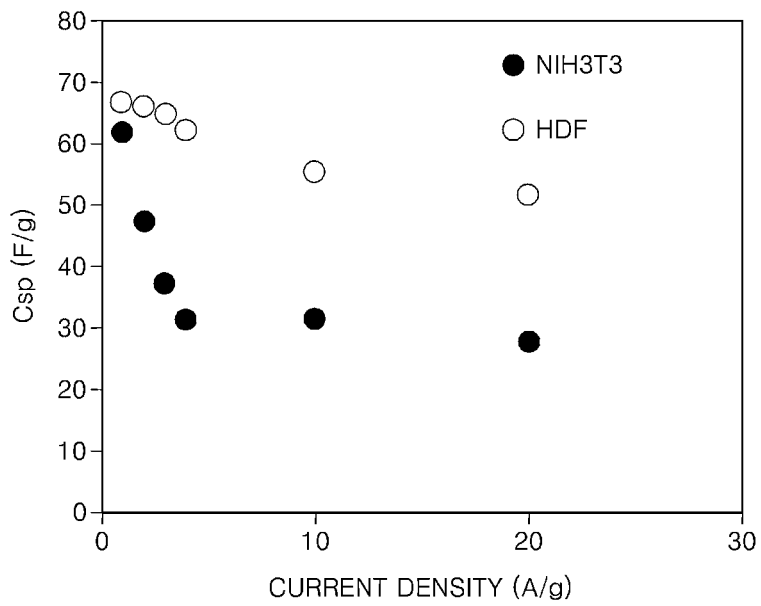

FIGS. 28A to 28C are graphs of specific capacitance as a function of potential scan rate obtained from the cyclic voltametry, and current density obtained from charge/discharge data. As shown in FIG. 28, the supercapacitor of Example 1 as an embodiment was found to operate smoothly both in PBS and AU, and to have a higher specific capacitance by about 2.5 times in the AU, than in the PBS, at the different potential scan rates and current densities.

Cytotoxicity and electrochemical performance of the supercapacitor as an embodiment were tested in a cell medium.

Figure 29A:
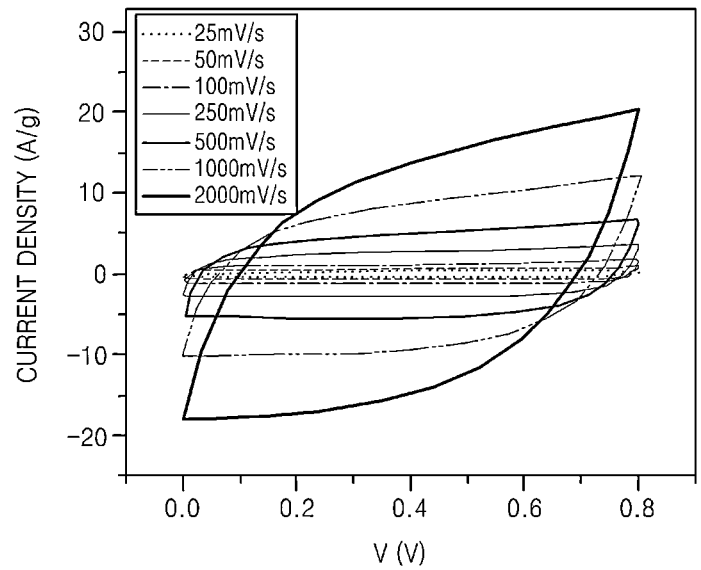
FIGS. 29A, 29B, 29C, and 29D are graphs showing specific capacitance of a supercapacitor including the conductive layered structure manufactured in Example 1 of the present inventive concept according to a cyclic voltammetry curve, a charge-discharge curve, cell mediumpotential scan rate, and current density respectively in the cell medium.
Figure 29B:
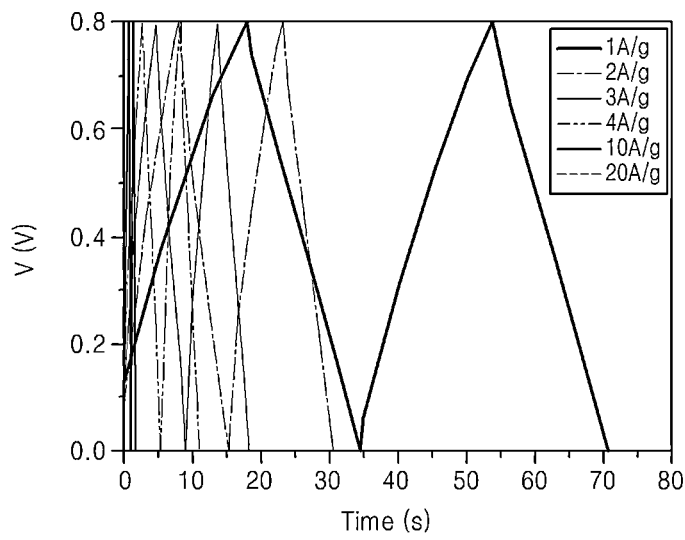
Figure 29C:
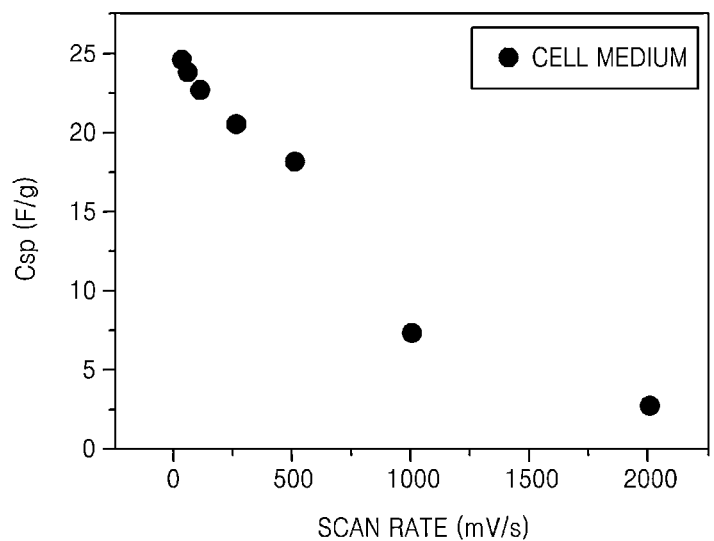
Figure 29D:
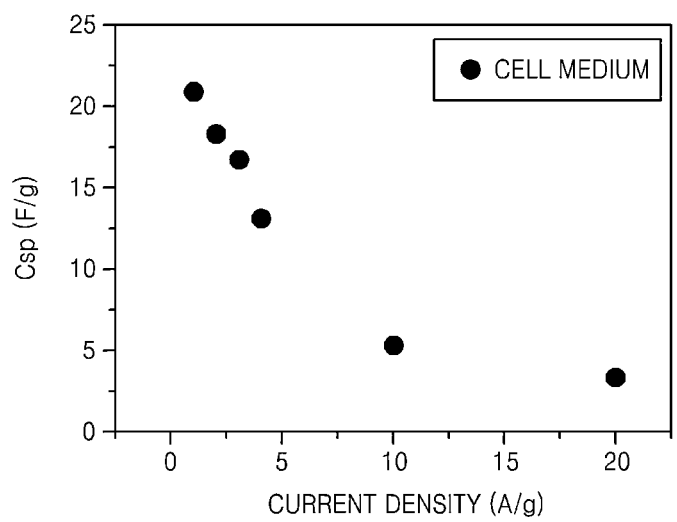

A cyclic voltammetry test and a charge/discharge test were conducted on the supercapacitor of Example 1 as an embodiment in the cell medium in the same manner as described above. The results are shown in FIGS. 29A and 29B. FIGS. 29C and 29D are graphs of specific capacitance as a function of potential scan rate obtained from the cyclic voltametry, and current density obtained from charge/discharge data. As shown in FIGS. 29C and 29D, the specific capacitance of the supercapacitor in the cell medium was similar or slightly lower than in the AU, and higher than in the PBS.

Figure 30A:
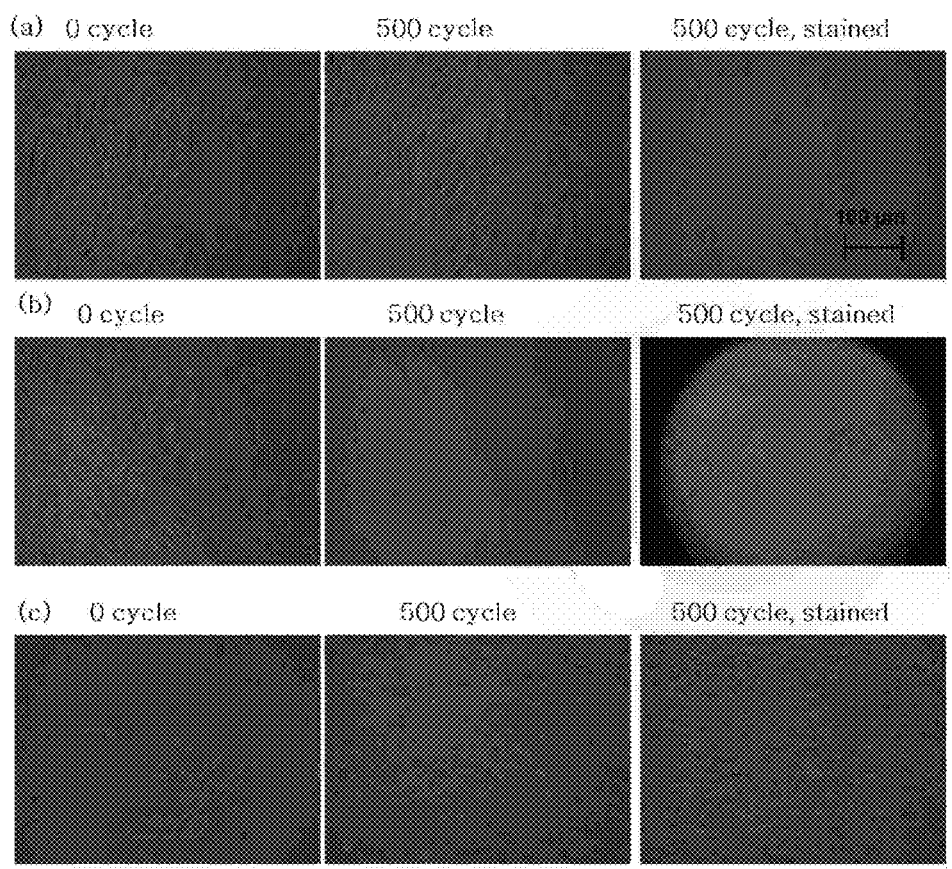
FIGS. 30A and 30B are images showing cell damage in the cell medium with respect to number of charge-discharge cycles of the supercapacitor including the conductive layered structure manufactured in Example 1 and Example 8-1, respectively.
Figure 30B:
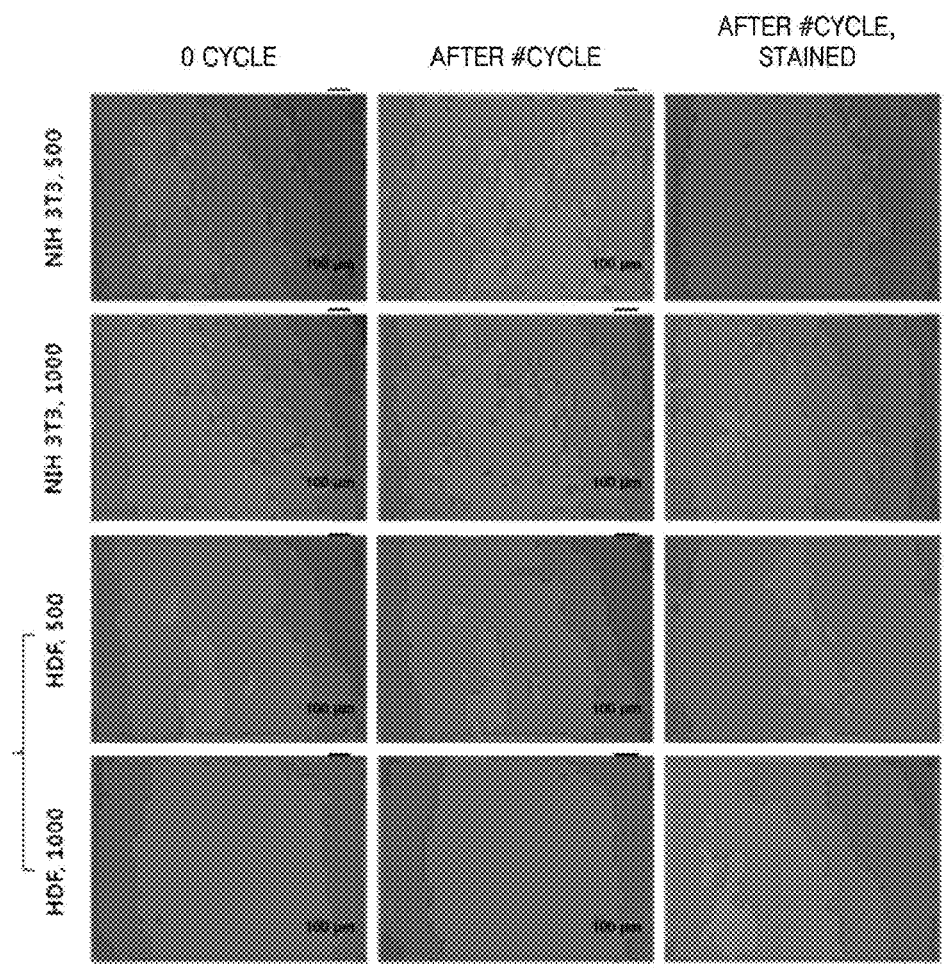

FIGS. 30A and 30B are images showing cell damage in the cell medium with respect to number of charge-discharge cycles of the supercapacitor including the conductive layered structure manufactured in Example 1 and Example 8-1, respectively. As shown in (a) of FIGS. 30A and 30B, the supercapacitor of Example 1 was found to have no impact on the cells up to the initial 100 cycles. However, after 500 cycles, separation or death of some cells was observed. This is attributed to the fact that a toxic conductive material bound unstable or loose to the supercapacitor was separated through the 500 times of the cycle. However, after the initial cycles for washing, charging/discharging of the supercapacitor was found to be no harmful to the cells, as illustrated in FIG. 15C. Therefore, the superconductor having undergone the initial washing cycles may be available as a biocompatible devise with nearly zero toxicity.

Figure 31:
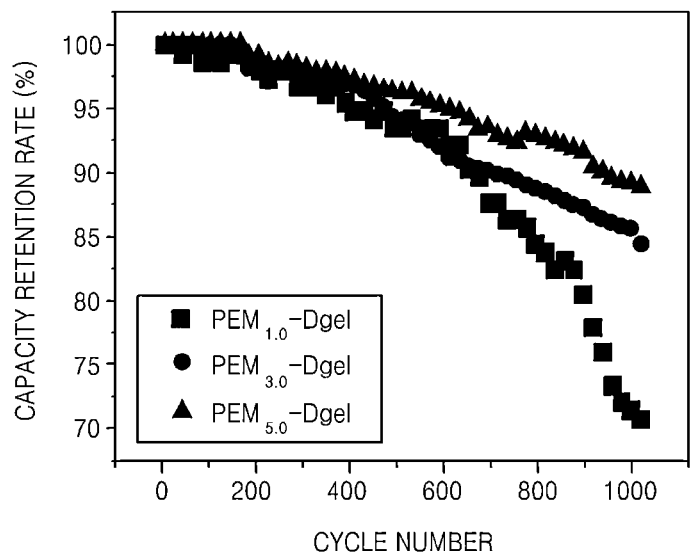
FIG. 31 is a graph showing capacity retention rate according to a number of charge-discharge cycles in the supercapacitor including the conductive layered structure manufactured in Example 1, Example 3, and Example 5.

FIG. 31 is a graph showing capacity retention rate according to a number of charge-discharge cycles in the supercapacitor when the multi-layered conductive polymer was used as an electrode. As shown in FIG. 31, the capacity retention rate improves according to an increase in the number of conductive polymer layers.

Figure 32A:
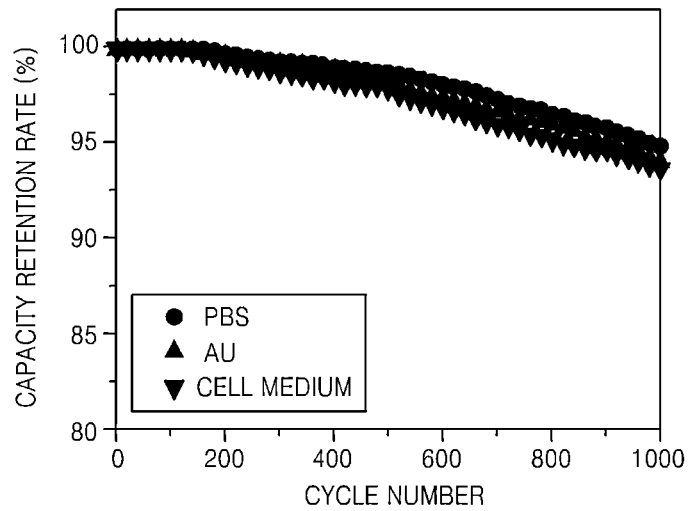
FIGS. 32A and 32B are graphs showing stability of specific capacitance of a supercapacitor including the conductive layered structure manufactured in Example 1 and Example 8-1, respectively, according to a number of charge-discharge cycles.

FIG. 32A is a graph showing the results of measuring stability of specific capacitance according to a number of charge-discharge cycles in the PBS, AU, and cell medium. Only about 5% to about 7% reduction in performance was observed in all the three solutions of PBS, AU, and cell medium during 1000 times of the cycle, indicating that the supercapacitor exhibits nearly consistent performance even after repeated multiple operations.

Figure 32B:
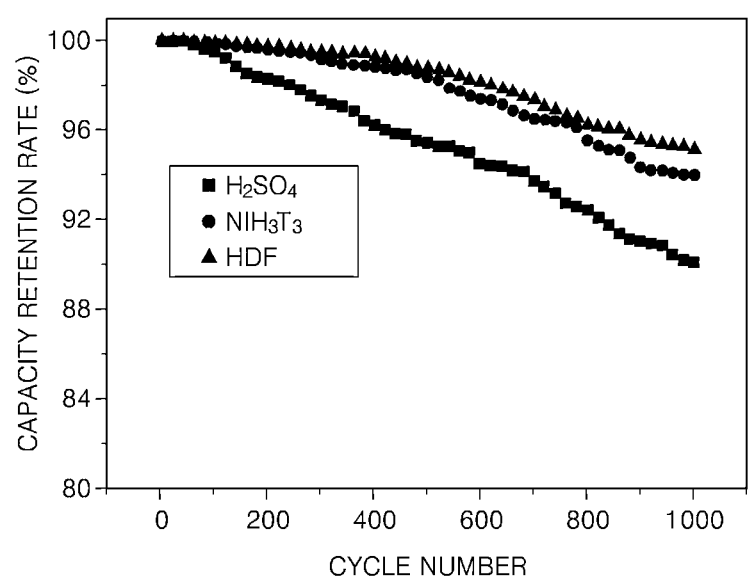

FIG. 32B is a graph showing stability of specific capacitance according to charge and discharge cycles in the case of an electrode in which CNT and PANI are laminated on a DNA hydrogel in NIH3T3 and HDF cell culture media and 1M of sulfuric acid. As shown in FIG. 32B, the reduction in specific capacitance is smaller by more than about 4% in sulfulric acid when charge and discharged for about 1000 times, indicating that the stability of the supercapacitor is excellent in physiological conditions.

As described above, according to the one or more of the above embodiments of the present inventive concept, a biocompatible, implantable electrode having a large specific surface area and a high conductivity may be manufactured through simple process without using a binder material or binding, and thus may be applicable in manufacturing a biocompatible or implantable energy storage device.

It should be understood that the exemplary embodiments described therein should be considered in a descriptive sense only and not for purposes of limitation. Descriptions of features or aspects within each embodiment should typically be considered as available for other similar features or aspects in other embodiments.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A conductive layered structure comprising:
   a DNA hydrogel; and
   a composite layer comprising a polymer electrolyte and a conductive material, the composite layer being disposed on the DNA hydrogel.

2. The conductive layered structure of claim 1, wherein the conductive material is a conductive polymer, a carbon nanotube, or a reduced graphene oxide.

3. The conductive layered structure of claim 1, wherein the conductive material is a carbon nanotube, and the composite layer further comprises polyaniline (PANI).

4. The conductive layered structure of claim 1, wherein the DNA hydrogel is bound to the composite layer by electrostatic attraction.

5. The conductive layered structure of claim 1, wherein the DNA hydrogel is formed by cross-linking at least one of X-shaped branched DNA, Y-shaped branched DNA, and T-shaped branched DNA.

6. The conductive layered structure of claim 1, wherein the composite layer has a multi-layer structure including 2 to 20 layers.

7. The conductive layered structure of claim 6, wherein the composite layer is an alternating stack of a polymer electrolyte layer having positive charges and a polymer electrolyte layer having negative charges, wherein a conductive material is dispersed in at least one layer of the composite layer.

8. The conductive layered structure of claim 7, wherein the polymer electrolyte having positive charges is at least one selected from among (poly(diallyldimethyl ammonium chloride) (PDADMAC), poly(allylamine hydrochloride) (PAH), poly(ethyleneimine) (PEI), and poly(dimethylamino-2-ethyl methacrylate) (PDMAEMA).

9. The conductive layered structure of claim 7, wherein the polymer electrolyte having negative charges is at least one selected from among poly(styrene sulfonate) (PSS), poly (acrylic acid) (PAA), poly(vinylsulfonate) (PVS), and poly[1-[4-(3-carboxy-4-hydroxyphenylazo)benzenesulfonamido]-1,2-ethanediyl, sodium salt] (PAZO).

10. The conductive layered structure of claim 1, wherein the conductive polymer is water-dispersible.

11. The conductive layered structure of claim 10, wherein the conductive polymer is at least one selected from among polyaniline, polythiophene, polypyrrole, and poly (3,4-ethylene dioxythiophene).

12. The conductive layered structure of claim 1, wherein the composite layer further comprises a PAH layer, a PAA-SWCNT layer, and a PANI layer, the composite layer being disposed to be symmetrically present on both sides of the DNA hydrogel.

13. An electrode comprising:
a current collector; and
an electrode active material disposed on the current collector, wherein the electrode active material comprises:
a DNA hydrogel; and
a composite layer comprising a polymer electrolyte and a conductive material, the composite layer being disposed on the DNA hydrogel.

14. The electrode of claim 13, wherein the DNA hydrogel and the composite layer are bound to each other by electrostatic attraction.

15. The electrode of claim 13, wherein the DNA hydrogel is formed by cross-linking at least one of X-shaped DNA, Y-shaped DNA, and T-shaped DNA.

16. The electrode of claim 13, wherein the composite layer has a multi-layer structure including 2 to 20 layers.

17. The electrode of claim 16, wherein the composite layer is disposed to be symmetrical on both sides with respect to the DNA hydrogel.

18. The electrode of claim 16, wherein the composite layer is an alternating stack of a polymer electrolyte layer having positive charges and a polymer electrolyte layer having negative charges, wherein a conductive material is dispersed in at least one layer of the composite layer.

19. The electrode of claim 18, wherein the polymer electrolyte having positive charges is at least one selected from among (poly(diallyldimethyl ammonium chloride) (PDADMAC), poly(allylamine hydrochloride) (PAH), poly(ethyleneimine) (PEI), and poly(dimethylamino-2-ethyl methacrylate) (PDMAEMA).

20. The electrode of claim 18, wherein the polymer electrolyte having negative charges is at least one selected from among poly(styrene sulfonate) (PSS), poly(acrylic acid) (PAA), poly(vinylsulfonate) (PVS), and poly[1-[4-(3-carboxy-4-hydroxyphenylazo)benzenesulfonamido]-1,2-ethanediyl, sodium salt] (PAZO).

21. The electrode of claim 13, wherein the current collector is a biocompatible current collector.

22. The electrode of claim 21, wherein the biocompatible current collector comprises at least one metal selected from among gold (Au), silver (Ag), platinum (Pt), titanium (Ti), and iron (Fe).

23. A method of manufacturing a conductive layered structure, the method comprising:
preparing a DNA hydrogel;
immersing the DNA hydrogel in a first polymer electrolyte solution having a first polarity opposite to the DNA hydrogel;
drying the DNA hydrogel having the first polymer electrolyte solution, to form a first polymer electrolyte layer disposed on a surface of the DNA hydrogel;
immersing the DNA hydrogel having the first polymer electrolyte layer in a second polymer electrolyte solution having a second polarity opposite to the first polarity; and
drying the DNA hydrogel having the first polymer electrolyte layer and the second polymer electrolyte solution, to form a second polymer electrolyte layer disposed on the first polymer electrolyte layer which is further disposed on the DNA hydrogel,
wherein the second polymer electrolyte layer is a composite layer comprising a conductive material dispersed in the second polymer electrolyte layer.

24. The method of claim 23, further comprising:
immersing the DNA hydrogel having the first and the second polymer electrolyte layers disposed on the DNA hydrogel in a third polymer electrolyte solution having a polarity opposite to the polarity of the second polymer electrolyte layer on the DNA hydrogel to form a DNA hydrogel having the first and the second polymer electrolyte layers disposed on the DNA hydrogel and the third polymer electrolyte disposed on the second polymer electrolyte layer;
drying the immersed DNA hydrogel to form a stack of layers disposed on the DNA hydrogel in the following sequence: the first polymer electrolyte layer, the second polymer electrolyte layer and the third polymer electrolyte layer; and
repeating the immersing and the drying to form an additional polymer electrolyte layer disposed on the stack of layers;
wherein one or more layers of the polymer electrolyte layers are composite layers in which a conductive material is dispersed in the polymer electrolyte.

25. The method of claim 23, wherein the conductive material is a conductive polymer, a carbon nanotube, or a reduced graphene oxide.

26. The method of claim 23, wherein the first polymer electrolyte solution and the second polymer electrolyte solution comprise a polymer electrolyte in a concentration of about 10 mM to about 100 mM.

27. The method of claim 23, wherein the second polymer electrolyte layer comprises about 0.5 wt % to about 2.0 wt % of a conductive polymer.

28. The method of claim 23, wherein the preparing a DNA hydrogel comprises:
preparing branched DNA by hybridization of a single-stranded DNA; and
cross-linking the branched DNA.

29. The method of claim 28, wherein the branched DNA is an X-shaped branched DNA, a Y-shaped branched DNA, or a T-shaped branched DNA.

30. The method of claim 23, wherein the drying is performed by freeze-drying.

31. The method of claim 30, wherein the freeze-drying is performed at a temperature of from about −60° to about −80° for about 12 hours to about 24 hours.

32. The method of claim 23, wherein the conductive material is one or more carbon nanotubes.

33. The method of claim 32 further comprising forming a PANI layer on the second polymer electrolyte layer.

34. The method of claim 33, wherein the PANI layer is formed from an aqueous solution comprising water soluble PANI in a concentration of about 5 mg/ml to about 40 mg/ml.

35. The method of claim 23, wherein the immersing is performed by dipping.

36. The method of claim 23, wherein the method further comprises washing before the drying.

37. A supercapacitor comprising:
a cathode;
an anode; and
an electrolyte disposed between the cathode and the anode, wherein at least one of the cathode and the anode is an electrode comprising a current collector and an electrode active material disposed on the current collector, and
wherein the electrode active material comprises:
a DNA hydrogel; and
a composite layer comprising a polymer electrolyte and a conductive material, the composite layer being disposed on the DNA hydrogel.

38. The supercapacitor of claim 37, wherein the electrolyte is at least one selected from among $H_2SO_4$, $Na_2SO_4$, $Li_2SO_4$, $LiPF_6$, lithium perchlorate, lithium tetrafluoroborate, KCl, KOH, and 1-ethyl-3-methylimidazolium bis(trifluoromethylsulfonyl)imide (EMIM/TFSI).

39. The supercapacitor of claim 37, wherein the current collector is a biocompatible current collector.

40. The supercapacitor of claim 39, further comprising a biocompatible separator.

41. The supercapacitor of claim 40, wherein the biocompatible separator comprises one of: polypropylene, polyethylene, Teflon, cellulose, and hydrogel.

42. The supercapacitor of claim 40, wherein the supercapacitor further comprises an insulating protection layer coating the cathode, the anode, and biocompatible separator such as to insulate the cathode, the anode, and the biocompatible separator from external environments.

43. The supercapacitor of claim 40, wherein the supercapacitor is implantable in bladder or eyeball.

44. The supercapacitor of claim 40, wherein the electrolyte is a biofluid.

45. An in-vivo electronic device comprising the conductive layered structure of claim 1.

46. The supercapacitor of claim 37, wherein upon inserting the supercapacitor in a human organ, a biofluid of the human organ functions as the electrolyte of the capacitor.

47. The method of claim 23, further comprising:
forming a stack of alternating layers on the DNA hydrogel;
wherein the stack of the alternating layers comprise layers of opposite polarities; and
wherein one or more layers of the stack of the alternating layers are composite layers in which a conductive material is dispersed in the polymer electrolyte.

48. The method of claim 47, wherein the alternating layers are formed in the same way as the first polymer electrolyte layer and the second polymer electrolyte layer.

* * * * *